US011347301B2

(12) United States Patent
Vidal

(10) Patent No.: US 11,347,301 B2
(45) Date of Patent: May 31, 2022

(54) DISPLAY OF INFORMATION ON A HEAD MOUNTED DISPLAY

(71) Applicant: Nokia Technologies Oy, Espoo (FI)

(72) Inventor: Melodie Vidal, San Francisco, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 773 days.

(21) Appl. No.: 15/303,648

(22) PCT Filed: Apr. 23, 2014

(86) PCT No.: PCT/US2014/035207
§ 371 (c)(1),
(2) Date: Oct. 12, 2016

(87) PCT Pub. No.: WO2015/163874
PCT Pub. Date: Oct. 29, 2015

(65) Prior Publication Data
US 2017/0038831 A1 Feb. 9, 2017

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0093* (2013.01); *G02B 27/017* (2013.01);
(Continued)

(58) Field of Classification Search
CPC combination set(s) only.
See application file for complete search history.

(56) References Cited

U.S. PATENT DOCUMENTS

| 5,742,264 A | 4/1998 | Inagaki et al. |
| 7,148,860 B2 | 12/2006 | Kooi et al. |

(Continued)

FOREIGN PATENT DOCUMENTS

| CN | 101317763 A | 12/2008 |
| CN | 101587542 A | 11/2009 |

(Continued)

OTHER PUBLICATIONS

International Search Report and Written Opinion received for corresponding Patent Cooperation Treaty Application No. PCT/US2014/035207, dated Aug. 28, 2015, 14 pages.

(Continued)

*Primary Examiner* — Robin J Mishler
(74) *Attorney, Agent, or Firm* — Alston & Bird LLP

(57) ABSTRACT

A method comprising causing display of information on a head mounted display that is worn by a user, receiving eye movement information associated with the user, receiving head movement information associated with the user, determining that the eye movement information and the head movement information are inconsistent with the user viewing the information on the head mounted display, and decreasing prominence of the information on the head mounted display based, at least in part, on the determination that the eye movement information and the head movement information are inconsistent with the user viewing the information on the head mounted display is disclosed.

17 Claims, 15 Drawing Sheets

(51) Int. Cl.
*G09G 3/00* (2006.01)
*G02B 27/00* (2006.01)

(52) U.S. Cl.
CPC .............. *G06F 3/012* (2013.01); *G06F 3/013* (2013.01); *G06F 3/017* (2013.01); *G09G 3/001* (2013.01); *G02B 2027/014* (2013.01); *G02B 2027/0178* (2013.01); *G02B 2027/0187* (2013.01); *G09G 2354/00* (2013.01)

(56) References Cited

U.S. PATENT DOCUMENTS

| | | |
|---|---|---|
| 7,401,920 B1 | 7/2008 | Kranz et al. |
| 2006/0098087 A1 | 5/2006 | Brandt et al. |
| 2006/0206175 A1 | 9/2006 | Fernandez Tournier et al. |
| 2008/0136916 A1 | 6/2008 | Wolff |
| 2012/0065549 A1 | 3/2012 | Shelhamer |
| 2013/0162632 A1 | 6/2013 | Varga et al. |
| 2013/0328925 A1 | 12/2013 | Latta et al. |
| 2014/0237366 A1* | 8/2014 | Poulos .................... G06F 3/013 715/728 |
| 2014/0267400 A1* | 9/2014 | Mabbutt ............... G06T 19/006 345/633 |
| 2015/0102771 A1 | 4/2015 | Fukuda |

FOREIGN PATENT DOCUMENTS

| | | |
|---|---|---|
| CN | 102591016 A | 7/2012 |
| JP | 2015-049883 A | 3/2015 |
| WO | 2015/102771 A1 | 7/2015 |

OTHER PUBLICATIONS

Uribe et al., "Eye Movements When Viewing a HMD Under Vibration", Proceedings of the Human Factors and Ergonomics Society Annual Meeting, Sep. 2013, 5 pages.

Notice of Allowance received for corresponding Japanese Patent Application No. 2016-564038, dated Oct. 3, 2017, 3 pages of Allowance and no page of translation available.

Extended European Search Report received for corresponding European Patent Application No. 14890383.4, dated Oct. 24, 2017, 9 pages.

Asteriadis et al., "Estimation of Behavioral User State Based On Eye Gaze and Head Pose: Application in an E-Learning Environment", Multimedia Tools and Applications, vol. 41, No. 3, Feb. 2009, pp. 469-493.

Doshi et al., "On the Roles of Eye Gaze and Head Dynamics in Predicting Driver's Intent to Change Lanes", IEEE Transactions on Intelligent Transportation Systems, vol. 10, No. 3, Sep. 2009, pp. 453-462.

Valenti et al., "Combining Head Pose and Eye Location Information for Gaze Estimation", IEEE Transactions on Image Processing, vol. 21, No. 2, Feb. 2012, pp. 802-815.

Office action received for corresponding Chinese Patent Application No. 201480080144.0, dated Aug. 23, 2018, 8 pages of office action and no page of translation available.

Notice of Allowance received for corresponding Korean Patent Application No. 2016-7032496, dated Aug. 28, 2018, 2 pages of Allowance and 1 page of translation available.

Office action received for corresponding Korean Patent Application No. 2016-7032496, dated Feb. 13, 2018, 5 pages of office action and no page of translation available.

Office Action for European Application No. 14890383.4 dated Feb. 20, 2019, 7 pages.

Office Action for Chinese Application No. 201480080144.0 dated Mar. 28, 2019, 7 pages.

Chinese Application No. 201480080144.0 dated Jul. 23, 2019, 8 pages.

Office Action for Philippine Application No. 1-2016-502067 dated Apr. 22, 2019, 4 pages.

Communication for European Application No. 14 890 383.4 dated Oct. 24, 2019, 4 pages.

Office Action for Philippine Application No. 1-2016-502067 dated Mar. 8, 2022, 4 pages.

\* cited by examiner

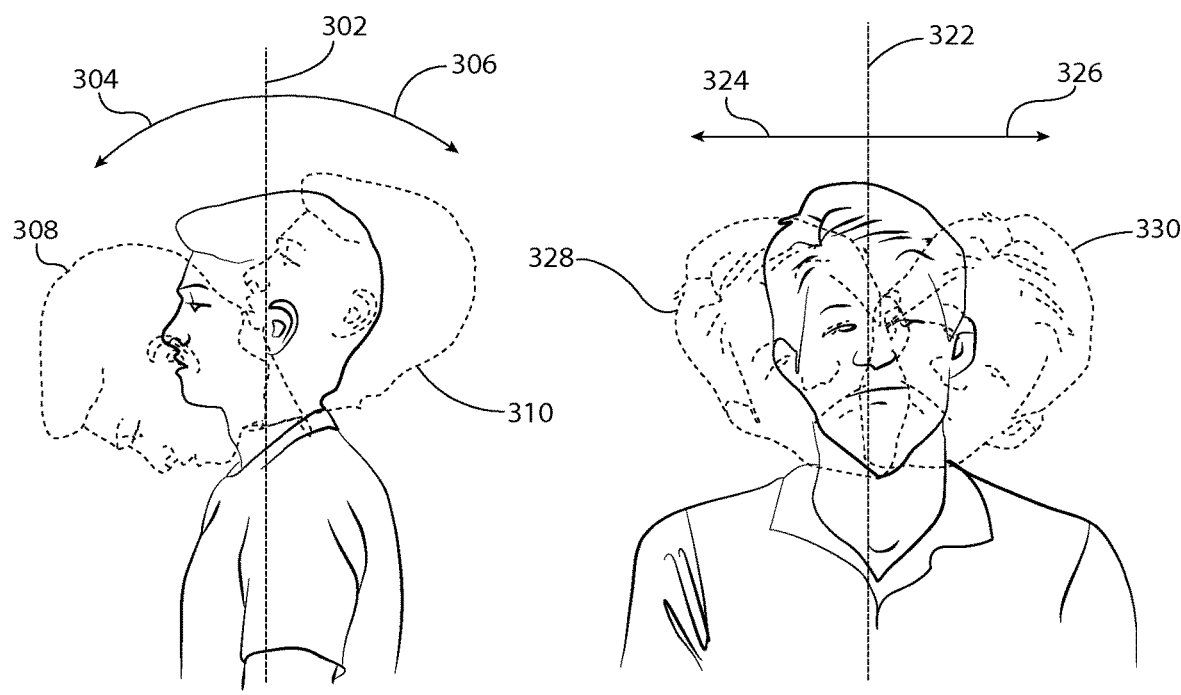
FIG. 3A
FIG. 3B
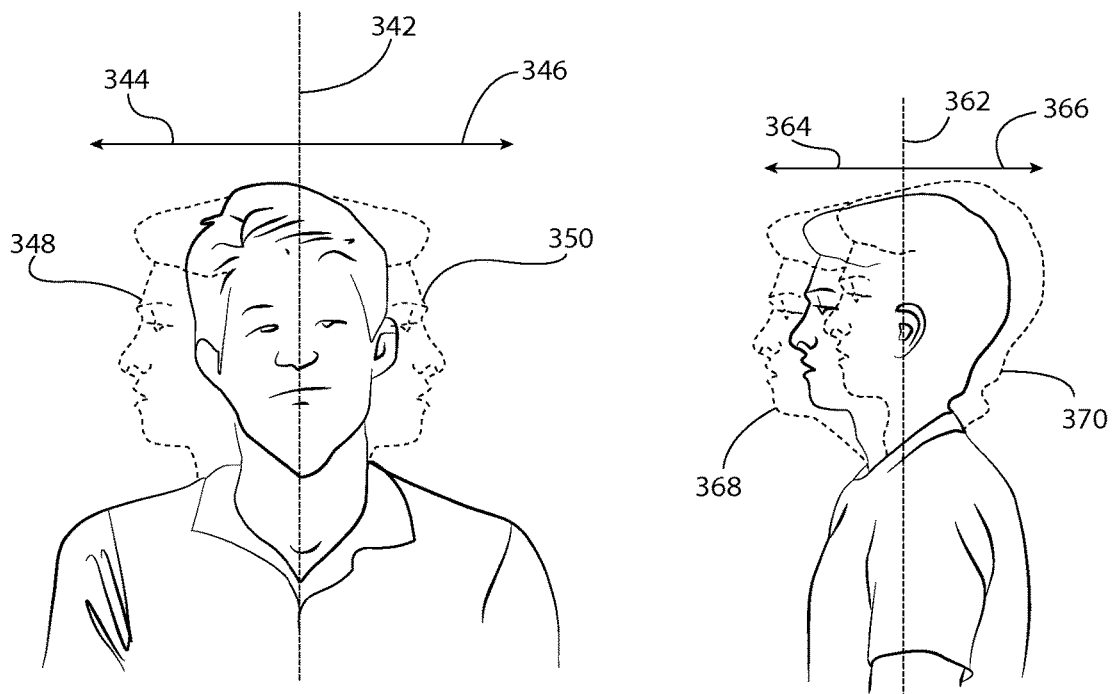
FIG. 3C
FIG. 3D

DISPLAY OF INFORMATION ON A HEAD MOUNTED DISPLAY

RELATED APPLICATION

This application was originally filed as PCT Application No. PCT/US2014/035207 filed Apr. 23, 2014.

TECHNICAL FIELD

The present application relates generally to display of information on a head mounted display.

BACKGROUND

As electronic apparatuses play an increasing role in the lives of their users, users have become more reliant on utilization of electronic apparatuses throughout their daily lives. For example, users may utilize their electronic apparatuses in various circumstances, and various environments. It has become increasingly desirable to allow for interaction between the user and the electronic apparatus in a manner that allows the user to perform other actions safely and without undue distraction.

SUMMARY

Various aspects of examples of the invention are set out in the claims.

One or more embodiments may provide an apparatus, a computer readable medium, a non-transitory computer readable medium, a computer program product, and/or a method for causing display of information on a head mounted display that is worn by a user, receiving eye movement information associated with the user, receiving head movement information associated with the user, determining that the eye movement information and the head movement information are inconsistent with the user viewing the information on the head mounted display, and decreasing prominence of the information on the head mounted display based, at least in part, on the determination that the eye movement information and the head movement information are inconsistent with the user viewing the information on the head mounted display.

One or more embodiments may provide an apparatus, a computer readable medium, a computer program product, and/or a non-transitory computer readable medium having means for causing display of information on a head mounted display that is worn by a user, means for receiving eye movement information associated with the user, receiving head movement information associated with the user, means for determining that the eye movement information and the head movement information are inconsistent with the user viewing the information on the head mounted display, and means for decreasing prominence of the information on the head mounted display based, at least in part, on the determination that the eye movement information and the head movement information are inconsistent with the user viewing the information on the head mounted display.

In at least one example embodiment, the decrease of prominence of the information on the head mounted display comprises causation of increase of visual permeability of, at least part of, the head mounted display.

In at least one example embodiment, visual permeability of the head mounted display refers to a propensity for visual information to pass through the head mounted display to the eye of the user.

In at least one example embodiment, visual permeability of the head mounted display refers to a propensity for visual information to pass through the head mounted display to the eye of the user with regard to the information displayed on the head mounted display.

In at least one example embodiment, the decrease of prominence of the information on the head mounted display comprises causation of increase of visual permeability of a center region of the head mounted display.

In at least one example embodiment, the decrease of prominence of the information on the head mounted display comprises causation of increase of visual permeability the information displayed on the head mounted display.

In at least one example embodiment, the decrease of prominence of the information on the head mounted display comprises termination of display of at least part of the information.

In at least one example embodiment, the termination of display of at least part of the information comprises termination of display of a part of the information that corresponds with a center region of the head mounted display.

In at least one example embodiment, the decrease of prominence of the information on the head mounted display comprises termination of display of an entirety of the information.

In at least one example embodiment, the causation of display of information comprises causation of display of the information at a position on the head mounted display, and the decrease of prominence of the information on the head mounted display comprises movement of the information from the position on the head mounted display to a different position on the head mounted display.

In at least one example embodiment, the different position on the head mounted display is further from a center position of the head mounted display than the position on the head mounted display.

One or more example embodiments further perform causation of display of an animation indicating progression of display of the representation of information from the position to the different position on the head mounted display.

In at least one example embodiment, the decrease of prominence of the information on the head mounted display comprises causation of a decrease of a size of, at least part of, the information.

In at least one example embodiment, the decrease of the size of the part of the information comprises decrease of the size of the part of the information that corresponds with a center region of the head mounted display.

In at least one example embodiment, the decrease of prominence of the information on the head mounted display comprises causation of a decrease of a size of an entirety of the information.

In at least one example embodiment, the decrease of prominence of the information on the head mounted display comprises causation of an increase of a transparency of, at least part of, the information.

In at least one example embodiment, the increase of the transparency of the part of the information comprises increase of the transparency of the part of the information that corresponds with a center region of the head mounted display.

In at least one example embodiment, the decrease of prominence of the information on the head mounted display comprises causation of an increase of a transparency of an entirety of the information.

In at least one example embodiment, the decrease of prominence of the information on the head mounted display comprises causation of a decrease of a brightness of, at least part of, the information.

In at least one example embodiment, the decrease of the brightness of the part of the information comprises decrease of the brightness of the part of the information that corresponds with a center region of the head mounted display.

In at least one example embodiment, the decrease of prominence of the information on the head mounted display comprises causation of a decrease of a brightness of an entirety of the information.

In at least one example embodiment, determination that the eye movement information and the head movement information are inconsistent with the user viewing the information on the head mounted display comprises determination that a head deviation direction is opposite to an eye deviation direction.

In at least one example embodiment, the eye movement information comprises information indicative of the eye deviation direction.

In at least one example embodiment, the head movement information comprises information indicative of the head deviation direction.

In at least one example embodiment, determination that they eye movement information and the head movement information are inconsistent with the user viewing the information on the head mounted display comprises determination that a magnitude of the eye movement is proportional to a magnitude of the head movement.

In at least one example embodiment, the eye movement information comprises information indicative of the magnitude of the eye movement.

In at least one example embodiment, the head movement information comprises information indicative of the magnitude of the head movement.

In at least one example embodiment, the determination that the eye movement information and the head movement information are inconsistent with the user viewing the information on the head mounted display comprises determination that the eye movement information is consistent with an offset of a head movement indicated by the head movement information.

In at least one example embodiment, the offset of the head movement refers to a gaze direction of the eye of the user prior to receipt of the head movement information and receipt of the eye movement information being substantially similar to a gaze direction of the eye of the user subsequent to receipt of the head movement information and receipt of the eye movement information.

In at least one example embodiment, substantially similar refers to any deviation in the gaze direction being within a gaze direction tolerance.

In at least one example embodiment, the determination that the eye movement information and the head movement information are inconsistent with the user viewing information on the head mounted display is independent of object tracking information.

In at least one example embodiment, the determination that the eye movement information and the head movement information are inconsistent with the user viewing information on the head mounted display excludes object tracking information.

In at least one example embodiment, the determination that the eye movement information and the head movement information are inconsistent with the user viewing information on the head mounted display excludes correlation between object tracking information and gaze tracking information.

One or more example embodiments further perform receipt of other eye movement information associated with the user, receipt of other head movement information associated with the user, determination that the other eye movement information and the other head movement information are consistent with the user viewing the information on the head mounted display, and increase of prominence of the information on the head mounted display based, at least in part, on the determination that the other eye movement information and the other head movement information are consistent with the user viewing the information on the head mounted display.

In at least one example embodiment, the determination that the eye movement information and the head movement information are consistent with the user viewing the information on the head mounted display is based, at least in part, on absence of substantial eye movement.

In at least one example embodiment, absence of substantial eye movement refers to any eye movement being within a threshold of insignificance.

In at least one example embodiment, the threshold of insignificance refers to a threshold of movement below which is consistent with viewing of the head mounted display.

In at least one example embodiment, receipt of the other eye movement information is performed subsequent to the decrease of prominence of the information on the head mounted display.

One or more example embodiments further perform determination that the eye movement information and the head movement information are consistent with the user viewing the information on the head mounted display, and retention of prominence of the information on the head mounted display based, at least in part, on the determination that the eye movement information and the head movement information are consistent with the user viewing the information on the head mounted display.

In at least one example embodiment, the retention of the prominence of the information on the head mounted display is performed prior to the decrease of prominence of the information on the head mounted display.

In at least one example embodiment, the increase of prominence of the information on the head mounted display comprises causation of decrease of visual permeability of a center region of the head mounted display.

In at least one example embodiment, the increase of prominence of the information on the head mounted display comprises causation of decrease of visual permeability the information displayed on the head mounted display.

In at least one example embodiment, the causation of display of information comprises causation of display of the information at a position on the head mounted display, and the increase of prominence of the information on the head mounted display comprises movement of the information from the position on the head mounted display to a different position on the head mounted display.

In at least one example embodiment, the different position on the head mounted display is nearer to a center position of the head mounted display than the position on the head mounted display.

In at least one example embodiment, the decrease of prominence of the information on the head mounted display comprises causation of a decrease of a size of, at least part of, the information.

In at least one example embodiment, the decrease of the size of the part of the information comprises decrease of the size of the part of the information that corresponds with a center region of the head mounted display.

In at least one example embodiment, the decrease of prominence of the information on the head mounted display comprises causation of a decrease of a size of an entirety of the information.

In at least one example embodiment, the decrease of prominence of the information on the head mounted display comprises causation of an increase of a transparency of, at least part of, the information.

In at least one example embodiment, the increase of the transparency of the part of the information comprises increase of the transparency of the part of the information that corresponds with a center region of the head mounted display.

In at least one example embodiment, the decrease of prominence of the information on the head mounted display comprises causation of an increase of a transparency of an entirety of the information.

In at least one example embodiment, the decrease of prominence of the information on the head mounted display comprises causation of a decrease of a brightness of, at least part of, the information.

In at least one example embodiment, the decrease of the brightness of the part of the information comprises decrease of the brightness of the part of the information that corresponds with a center region of the head mounted display.

In at least one example embodiment, the decrease of prominence of the information on the head mounted display comprises causation of a decrease of a brightness of an entirety of the information.

In at least one example embodiment, the eye deviation direction is a direction characterized by elevation of an eye.

In at least one example embodiment, the eye deviation direction is a direction characterized by depression of an eye.

In at least one example embodiment, the eye deviation direction is a direction characterized by adduction of an eye.

In at least one example embodiment, the eye deviation direction is a direction characterized by abduction of an eye.

In at least one example embodiment, the eye deviation direction is a direction characterized by rightward movement of an eye.

In at least one example embodiment, the rightward movement of the eye is characterized by at least one of abduction of a right eye or adduction of a left eye.

In at least one example embodiment, the eye deviation direction is a direction characterized by leftward movement of an eye.

In at least one example embodiment, the leftward movement of the eye is characterized by at least one of adduction of a right eye or abduction of a left eye.

In at least one example embodiment, the eye deviation direction is a direction characterized by abduction and elevation of an eye.

In at least one example embodiment, the eye deviation direction is a direction characterized by adduction and depression of an eye.

In at least one example embodiment, the head deviation direction is a direction characterized by flexion of the neck.

In at least one example embodiment, the head deviation direction is a direction characterized by extension of the neck.

In at least one example embodiment, the head deviation direction is a direction characterized by leftward lateral rotation of the neck.

In at least one example embodiment, the head deviation direction is a direction characterized by rightward lateral rotation of the neck.

In at least one example embodiment, the head deviation direction is a direction characterized by forward deviation of the neck.

In at least one example embodiment, the head deviation direction is a direction characterized by rearward deviation of the neck.

In at least one example embodiment, the head deviation direction is a direction characterized by leftward lateral flexion of the neck.

In at least one example embodiment, the head deviation direction is a direction characterized by rightward lateral flexion of the neck.

In at least one example embodiment, the head deviation direction is a direction characterized by rearward deviation and extension of the neck.

In at least one example embodiment, the head deviation direction is a direction characterized by leftward lateral rotation and flexion of the neck.

In at least one example embodiment, the head deviation direction is a direction characterized by rightward lateral flexion, rightward lateral rotation, and forward deviation of the neck.

One or more example embodiments further perform determination of the eye movement information.

In at least one example embodiment, the eye movement information comprises eye movement sensor information.

In at least one example embodiment, the eye movement sensor information is information received from at least one of an optical sensor, an imaging sensor, or a magnetometer sensor.

One or more example embodiments further perform determination of the head movement information.

In at least one example embodiment, the head movement information comprises head movement sensor information.

In at least one example embodiment, the head movement sensor information is information received from at least one of a magnetometer sensor, a gyroscope sensor, an accelerometer sensor, an orientation sensor, a myoelectric sensor, an optical sensor, or an imaging sensor.

BRIEF DESCRIPTION OF THE DRAWINGS

For a more complete understanding of embodiments of the invention, reference is now made to the following descriptions taken in connection with the accompanying drawings in which:

FIGS. 3A-3D are diagrams illustrating head movement, head orientation, head deviation direction, and/or magnitude of head movement according to at least one example embodiment;

DETAILED DESCRIPTION OF THE DRAWINGS

Figure 1:
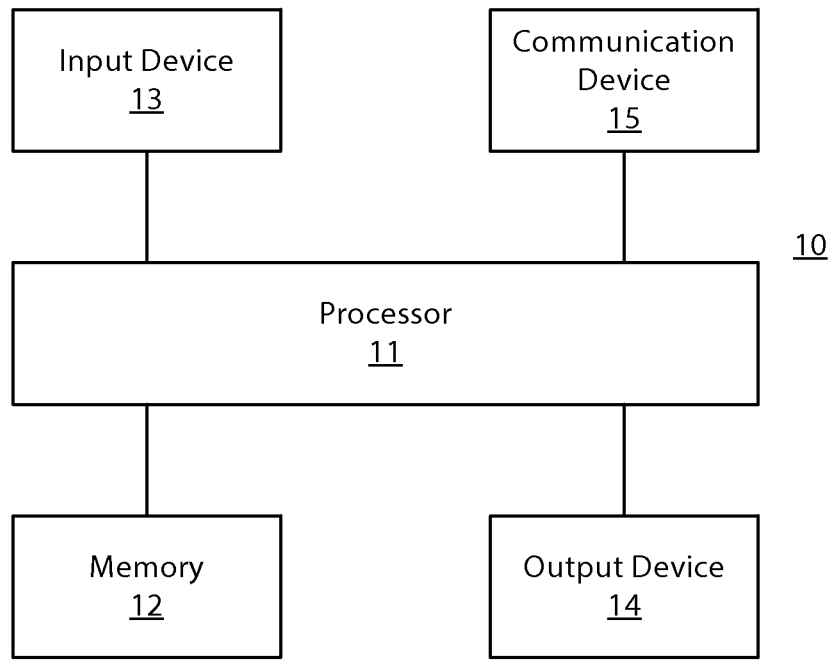
FIG. 1 is a block diagram showing an apparatus according to at least one example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a head mounted display, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
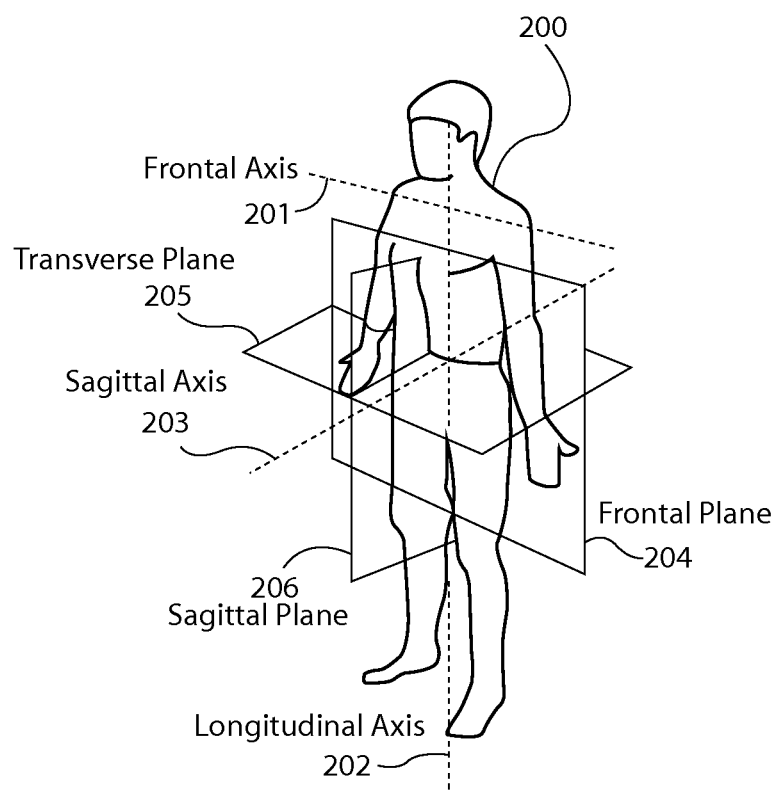
FIG. 2 is a diagram illustrating anatomical terms of location, orientation, and/or the like, with respect to a user according to at least one example embodiment.

FIG. 2 is a diagram illustrating anatomical terms of location, orientation, and/or the like, with respect to user 200. It can be seen that user 200 is depicted in an anatomic position. An anatomic position is a posture of a human body in which the body is standing with legs slightly apart with feet forward and palms facing forward.

The body of user 200 may be described in relation to three fundamental axes that are orthogonal to each other; the frontal axis, the longitudinal axis, and the sagittal axis. Frontal axis 201 is an imaginary line that extends from right to left through the center of user 200. Longitudinal axis 202 is a line that extends from superior (upper) to inferior (lower) through the center of user 200. Sagittal axis 203 is a line that extends from anterior to posterior through the center of user 200. Frontal plane 204 is a plane that divides user 200 into anterior and posterior halves along frontal axis 201 and longitudinal axis 202. It can be seen that, in the anatomical position, the frontal plane divides the head and neck of user 200 when user 200 is in the anatomic position. Transverse plane 205 is a plane that divides user 200 into superior and inferior parts through frontal axis 201 and sagittal axis 203. Sagittal plane 206 is a plane that divides user 200 into left and right parts through sagittal axis 203 and longitudinal axis 202. It can be seen that, in the anatomical position, the sagittal plane divides the head and neck of user 200 when user 200 is in the anatomic position.

In the example of FIG. 2, the head of user 200 is held such that the head is divided in half by frontal plane 204 and sagittal plane 206. The head of user 200 faces a direction parallel to sagittal axis 203. In the example of FIG. 2, the neck of user 200 is held straight and erect such that the neck is divided in half by frontal plane 204 and sagittal plane 206. The neck of user 200 is held such that the neck is centered on longitudinal axis 202. In at least one example embodiment, an orientation of the head of a user such that the head is facing forwards and the user's neck is erect may be an anatomical position head orientation. For example, FIG. 2 illustrates user 200 positioned in an anatomical position such that the head of user 200 is held in an anatomical position head orientation.

FIGS. 3A-3D are diagrams illustrating head movement, head orientation, head deviation direction, and/or magnitude of head movement according to at least one example embodiment. The examples of FIGS. 3A-3D are merely examples and do not limit the scope of the claims. For example, head movement may vary, head orientation may vary, range of head movement, and/or the like.

In some circumstances, it may be desirable to identify movement of the user's head. Physical movement with respect to a head may be characterized in terms of fundamental movements. For example, a complex head movement may be characterized by the manner in which the complex movement incorporates distinct fundamental movements. FIGS. 3A-3D illustrate examples of such fundamental movements. In at least one example embodiment, a fundamental movement of the head is a movement of the head in a head deviation direction. For example, the head deviation direction may identify a direction of movement of the head from a head orientation to a different head orientation. The movements of FIGS. 3A-3D are described in relation to movement from an anatomical position head orientation, similar as may be described regarding FIG. 2.

In some circumstances, it may be desirable to identify an orientation of the head of a user based, at least in part, on a position of the user's head and/or neck. In at least one example embodiment, a head orientation is a spatial orientation of the head of the user. In some circumstances, it may be desirable to characterize such head orientations of the user. For example, it may be desirable to distinguish a head orientation from a different head orientation, to classify a head orientation as a specific head orientation, and/or the like. In at least one example embodiment, a head orientation may be identified by a head deviation direction. FIGS. 3A-3D illustrate examples of such fundamental movements. The head orientations of FIGS. 3A-3D are described with respect to an anatomical position head orientation, similar as may be described regarding FIG. 2.

In some circumstances, it may be desirable to characterize a fundamental movement of the head by a magnitude of the head movement. In at least one example embodiment, a magnitude of a head movement is indicative of the distance of movement between the head orientation before the head movement and the head orientation after the head movement. In at least one example embodiment, a magnitude of a head movement is an angle between the head orientation before the head movement and the head orientation after the head movement. FIGS. 3A-3D illustrate examples of such distances and/or angles.

FIG. 3A is a diagram illustrating head orientation associated with flexion and extension of a neck from an anatomical position head orientation according to at least one example embodiment. Head orientation may be described in terms of flexion and extension of the neck of a user from an anatomical position head orientation. In the example of FIG. 3A, a user is positioned in an anatomical position such that the user's head and neck are bisected by frontal plane 302. Flexion 304 is a deviation of the head and/or neck characterized by tilting of the head in a downward direction from the anatomical position head orientation along the sagittal plane. Extension 306 is a deviation of the head and/or neck characterized by tilting of the head in an upward direction from the anatomical position head orientation along the sagittal plane. In at least on example embodiment, a head deviation direction is a downward head deviation direction. For example, movement of the head in a downward head deviation direction from an anatomical position head orientation causes the head to become oriented as illustrated by head orientation 308. In at least on example embodiment, a head deviation direction is an upward head deviation direction. For example, movement of the head in an upward head deviation direction from an anatomical position head orientation causes the head to become oriented as illustrated by head orientation 330. In at least one example embodiment, a movement of the head in an upward head deviation direction or a downward head deviation direction has a magnitude of the head movement. For example, the orientation before a movement may be the anatomical position head orientation, and the head orientation position after the movement may be head orientation 308. In this example, the magnitude of the movement will be less than a movement in which the orientation before the movement was head orientation 310 and the orientation after the movement is head orientation 308.

FIG. 3B is a diagram illustrating head orientation associated with leftward lateral flexion and rightward lateral flexion of a neck from an anatomical position head orientation according to at least one example embodiment. Head orientation may be described in terms of leftward lateral flexion and rightward lateral flexion of the neck of a user from an anatomical position head orientation. In the example of FIG. 3B, a user is positioned in an anatomical position such that the user's head and neck are bisected by sagittal plane 322. Leftward lateral flexion 324 is a deviation of the head and/or neck characterized by tilting of the head in a leftward lateral direction from the anatomical position head orientation along the frontal plane. Rightward lateral flexion 326 is a deviation of the head and/or neck characterized by tilting of the head in a rightward lateral direction from the anatomical position head orientation along the sagittal plane. In at least on example embodiment, a head deviation direction is a leftward lateral head deviation direction. For example, movement of the head in a leftward lateral head deviation direction from an anatomical position head orientation causes the head to become oriented as illustrated by head orientation 328. In at least on example embodiment, a head deviation direction is a rightward lateral head deviation direction. For example, movement of the head in a rightward lateral head deviation direction from an anatomical position head orientation causes the head to become oriented as illustrated by head orientation 330. In at least one example embodiment, a movement of the head in a leftward lateral head deviation direction or a rightward lateral head deviation direction has a magnitude of the head movement. For example, the orientation before a movement may be the anatomical position head orientation, and the head orientation position after the movement may be head orientation 328. In this example, the magnitude of the movement will be less than a movement in which the orientation before the movement was head orientation 330 and the orientation after the movement is head orientation 328.

FIG. 3C is a diagram illustrating head orientation associated with leftward lateral rotation and rightward lateral rotation of a neck from an anatomical position head orientation according to at least one example embodiment. Head orientation may be described in terms of leftward lateral rotation and rightward lateral rotation of the neck of a user from an anatomical position head orientation. In the example of FIG. 3C, a user is positioned in an anatomical position such that the user's head and neck are bisected by sagittal plane 342. Leftward lateral rotation 344 is a deviation of the head and/or neck characterized by rotation of the head in a leftward direction from the anatomical position head orientation along a longitudinal axis. Rightward lateral rotation 346 is a deviation of the head and/or neck characterized by rotation of the head in a rightward direction from the anatomical position head orientation along a longitudinal axis. In at least on example embodiment, a head deviation direction is a leftward rotational head deviation direction. For example, movement of the head in a leftward rotational head deviation direction from an anatomical position head orientation causes the head to become oriented as illustrated by head orientation 348. In at least on example embodiment, a head deviation direction is a rightward rotational head deviation direction. For example, movement of the head in a rightward rotational head deviation direction from an anatomical position head orientation causes the head to become oriented as illustrated by head orientation 350. In at least one example embodiment, a movement of the head and/or neck in a leftward rotational head deviation direction or a rightward rotational head deviation direction has a magnitude of the head movement. For example, the orientation before a movement may be the anatomical position head orientation, and the head orientation position after the movement may be head orientation 348. In this example, the magnitude of the movement will be less than a movement in which the orientation before the movement was head orientation 350 and the orientation after the movement is head orientation 348.

FIG. 3D is a diagram illustrating head orientation associated with forward deviation and rearward deviation of a neck from an anatomical position head orientation according to at least one example embodiment. Head orientation may be described in terms of forward deviation and rearward deviation of the neck of a user from an anatomical position head orientation. In the example of FIG. 3D, a user is positioned in an anatomical position such that the user's head and neck are bisected by frontal plane 362. Forward deviation 364 is a deviation of the head and/or neck characterized by extending of the head and/or chin in an outward direction from the anatomical position head orientation along the sagittal plane. Rearward deviation 366 is a movement of the head and/or neck characterized by withdrawing of the head and/or chin in an inward direction from the anatomical position head orientation along the sagittal plane. In at least on example embodiment, a head deviation direction is a forward head deviation direction. For example, movement of the head in a forward head deviation direction from an anatomical position head orientation causes the head to become oriented as illustrated by head orientation 368. In at least on example embodiment, a head deviation direction is a rearward head deviation direction. For example, movement of the head in a rearward head deviation direction from an anatomical position head orientation causes the head to become oriented as illustrated by head orientation 370. In at least one example embodiment, a movement of the head in a forward head deviation direction or a rearward head deviation direction has a magnitude of the head movement. For example, the orientation before a movement may be the anatomical position head orientation, and the head orientation position after the movement may be head orientation 368. In this example, the magnitude of the movement will be less than a movement in which the orientation before the movement was head orientation 370 and the orientation after the movement is head orientation 368.

As discussed previously, in some circumstances, it may be desirable to characterize a complex head movement by the manner in which the complex movement incorporates distinct fundamental movements. Although the examples of FIGS. 3A-3D each illustrate distinct types of fundamental movements, such movements may be combined in order to facilitate characterization of complex head movements, head orientations, head deviation directions, and/or the like. In one example, a head deviation direction may identify a head movement direction as a movement direction associated with rearward deviation and extension of the neck. In another example, a head deviation direction may identify a head movement direction as a movement direction associated with leftward lateral rotation and flexion of the neck. In yet another example, a head deviation direction may identify a head movement direction as a movement direction associated with rightward lateral flexion, rightward lateral rotation, and forward deviation of the neck.

FIGS. 4A-4E are diagrams illustrating eye movement, eye orientation, eye deviation direction, and/or magnitude of eye movement according to at least one example embodiment. The examples of FIGS. 4A-4E are merely examples and do not limit the scope of the claims. For example, eye movement may vary, eye orientation may vary, eye deviation direction may vary, and/or the like.

In some circumstances, it may be desirable to identify a movement of the user's eyes. Physical movement with respect to an eye may be characterized in terms of fundamental movements. For example, a complex eye movement may be characterized by the manner in which the complex movement incorporates distinct fundamental movements. FIGS. 4B-4E illustrate examples of such fundamental movements. In at least one example embodiment, a fundamental movement of an eye is a movement of the eye in an eye deviation direction. For example, the eye deviation direction may identify a direction of movement of the eye from an eye orientation to a different eye orientation. The movements of FIGS. 4B-4E are described in relation to movement from an eye orientation. In at least one example embodiment, a centered eye orientation is an orientation indicative of a primary position of an eye of a user. For example, the primary position may be a natural resting position of the eye of the user, a position of the eye associated with the user looking straight ahead, a position of the eye such that the iris is spatially centered within the eye opening, and/or the like.

In some circumstances, it may be desirable to identify an orientation of an eye of a user based, at least in part, on a position of at least one eye of the user. In at least one example embodiment, an eye orientation is a spatial orientation of an eye of a user. In some circumstances, it may be desirable to characterize such eye orientations of the user. For example, it may be desirable to distinguish an eye orientation from a different eye orientation, to classify an eye orientation as a specific eye orientation, and/or the like. In at least one example embodiment, an eye orientation may be identified by an eye deviation direction. FIGS. 4B-4E illustrate examples of such fundamental movements. The eye orientations of FIGS. 4B-4E are described with respect to a centered eye orientation.

Figure 4A:
FIGS. 4A-4E are diagrams illustrating eye movement, eye orientation, eye deviation direction, and/or magnitude of eye movement according to at least one example embodiment.

FIG. 4A is a diagram illustrating a centered eye orientation. In the example of FIG. 4A, eye orientation 402 is a centered eye orientation. As illustrated in the example of FIG. 4A, eye orientation 402 is an orientation in which the iris is spatially centered within the eye opening, the eyelids, and/or the like. Eye orientation 402 may be a primary position of the eye such that eye orientation 402 is associated with a natural resting position of the eye.

Figure 4B:

FIG. 4B is a diagram illustrating elevation of an eye from a centered eye orientation according to at least one example embodiment. Eye orientation may be described in terms of elevation of an eye. Elevation 412 is a movement of the eye associated with movement of the eye upwards from an eye orientation. In at least one example embodiment, an eye deviation direction is an upward eye deviation direction. For example, movement of the eye in an upward deviation direction from the centered eye orientation causes the eye to be to become oriented as illustrated by eye orientation 414.

Figure 4C:

FIG. 4C is a diagram illustrating depression of an eye from a centered eye orientation according to at least one example embodiment. Eye orientation may be described in terms of depression of an eye. Depression 422 is a movement of the eye associated with movement of the eye downwards from an eye orientation. In at least one example embodiment, an eye deviation direction is a direction characterized by depression of an eye from an eye orientation. For example, in FIG. 4C, eye orientation 424 illustrates an eye orientation associated with an eye deviation direction identifying a direction characterized by depression of the eye from the centered eye orientation. In at least one example embodiment, an eye deviation direction is a downward eye deviation direction. For example, movement of the eye in a downward deviation direction from the centered eye orientation causes the eye to be to become oriented as illustrated by eye orientation 424.

Figure 4D:
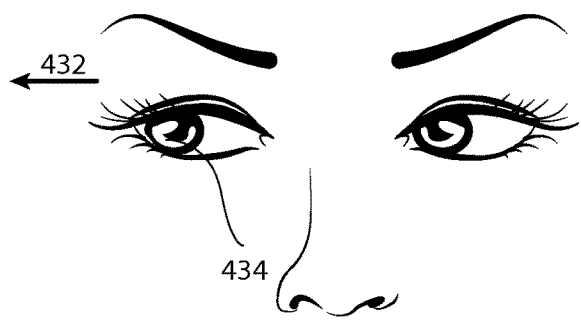

FIG. 4D is a diagram illustrating rightward movement of an eye from a centered eye orientation according to at least one example embodiment. Eye orientation may be described in terms of rightward of an eye from an eye orientation. Rightward movement 432 is a movement of the eye associated with movement of the eye towards the right side of a user's body from the centered eye orientation. In at least one example embodiment, an eye deviation direction is a direction characterized by rightward movement of an eye from an eye orientation. In at least one example embodiment, rightward movement of an eye is characterized by abduction of a right eye from an eye orientation, adduction of a left eye from an eye orientation, and/or the like. Adduction of an eye may relate to movement of the eye to a position closer to a user's nose than an eye orientation. Abduction of an eye may relate to movement of the eye to a position further from a user's nose than an eye orientation. In at least one example embodiment, an eye deviation direction is a rightward eye deviation direction. For example, movement of the eye in a rightward deviation direction from the centered eye orientation causes the eye to be to become oriented as illustrated by eye orientation 434.

Figure 4E:

FIG. 4E is a diagram illustrating leftward movement of an eye from a centered eye orientation according to at least one example embodiment. Eye orientation may be described in terms of leftward movement of an eye from an eye orientation. Leftward movement 442 is a movement of the eye associated with movement of the eye towards the left side of a user's body from an eye orientation. In at least one example embodiment, an eye deviation direction is a direction characterized by leftward movement of an eye from an eye orientation. In at least one example embodiment, leftward movement of an eye is characterized by adduction of a right eye from an eye orientation, abduction of a left eye from an eye orientation, and/or the like. In at least one example embodiment, an eye deviation direction is a leftward eye deviation direction. For example, movement of the eye in a leftward deviation direction from the centered eye orientation causes the eye to be to become oriented as illustrated by eye orientation 444.

In some circumstances, it may be desirable to characterize a fundamental movement of an eye by a magnitude of the eye movement. In at least one example embodiment, a magnitude of an eye movement of is indicative of the distance between the eye orientation before the eye movement and the eye orientation after the eye movement. In at least one example embodiment, a magnitude of an eye movement is an angle between the eye orientation before the eye movement, and the eye orientation after the eye movement. For example, the orientation before a movement may be the centered eye orientation, and the eye orientation position after the movement may be eye orientation 414. In this example, the magnitude of the movement will be less than a movement in which the orientation before the movement was eye orientation 424 and the orientation after the movement is eye orientation 414.

As discussed previously, in some circumstances, it may be desirable to characterize a complex eye movement by the manner in which the complex movement incorporates distinct fundamental movements. Although the examples of FIGS. 4B-4E each illustrate distinct types of fundamental movements, such movements may be combined in order to facilitate characterization of complex eye movements, eye orientations, eye deviation directions, and/or the like. In one example, an eye deviation direction may be a direction characterized by abduction and elevation of an eye from the centered eye orientation. In another example, an eye deviation direction may be a direction characterized by adduction and depression of an eye from the centered eye orientation.

Figure 5A:
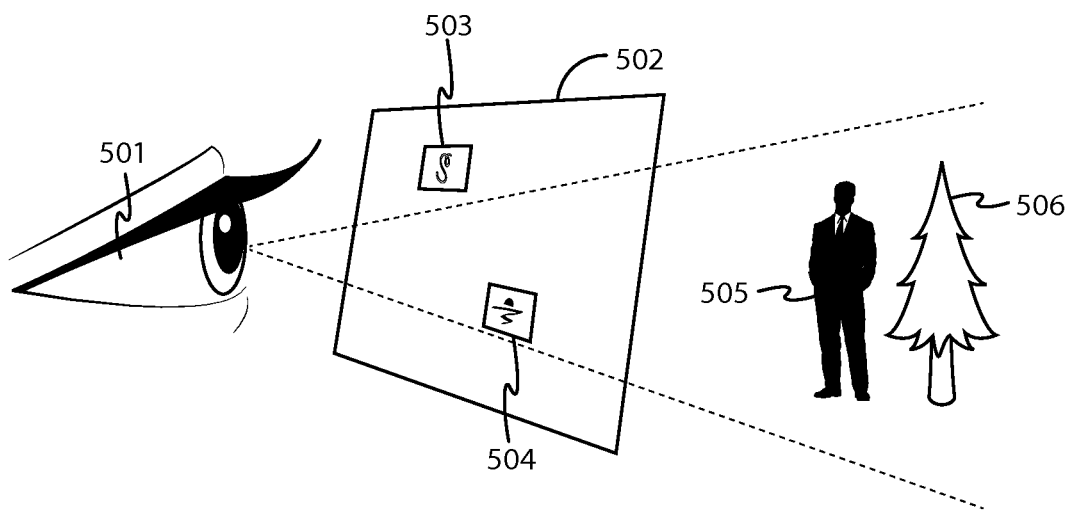
FIGS. 5A-5B are diagrams illustrating see through displays according to at least one example embodiment.
Figure 5B:
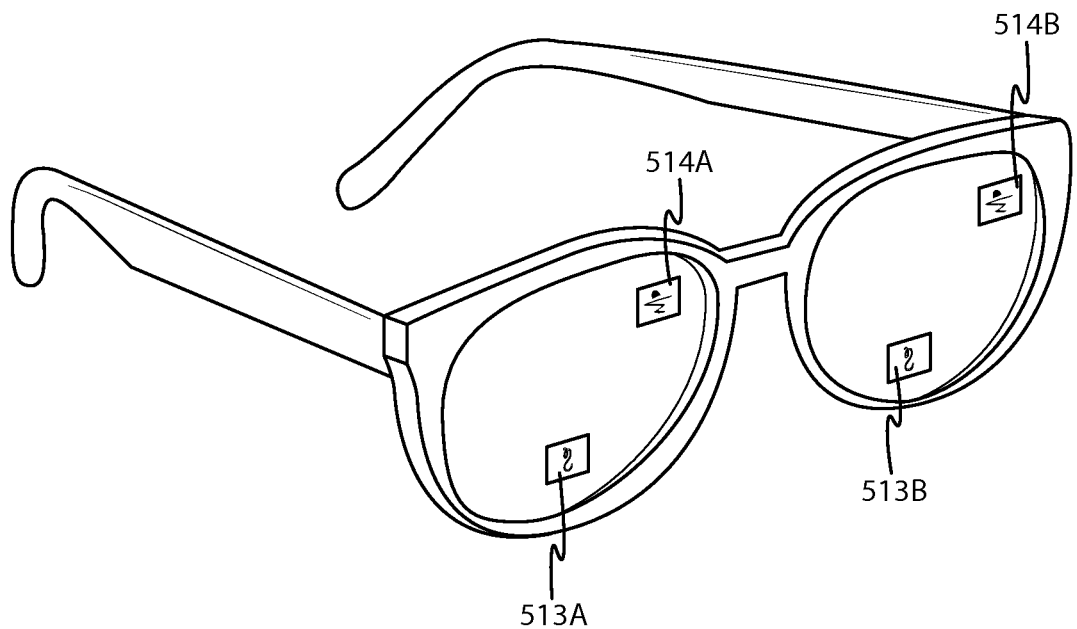

FIGS. 5A-5B are diagrams illustrating see through displays according to at least one example embodiment. The examples of FIGS. 5A-5B are merely examples and do not limit the scope of the claims. For example, configuration of the see through display may vary, relationship between the user and the see through display may vary, shape of the see through display may vary, opacity of the see through display may vary, and/or the like.

In some circumstances, it may be desirable for a display to be a see through display. In at least one example embodiment, a see through display is a display that presents information to a user, but through which objects on an opposite side of the display from the user may be seen. A see through display may be comprised by a window, a windshield, a visor, glasses, a head mounted display, and/or the like. A head mounted display may, for example, be a display that is head mountable, a display that is coupled to an element that is wearable at a location on and/or proximate to the head of a user, a display that is wearable at a location on and/or proximate to the head of a user, and/or the like.

FIG. 5A is a diagram illustrating see through display 502 according to at least one example embodiment. In at least one example embodiment, displaying information on a see through display so that the information corresponds with one or more objects viewable through the see through display is referred to as augmented reality. In the example of FIG. 5A, user 501 may perceive objects 505 and 506 through see through display 502. In at least one example embodiment, the see through display may display information to the user. For example, display 502 may display information 503 and information 504. Information 503 and information 504 may be positioned on display 502 such that the information corresponds with one or more objects viewable through see through display 502, such as object 505. In such an example, information 503 may be associated with, identify, and/or the like, object 505. For example, information 503 may indicate an identity of object 505. In at least one example embodiment, display 502 may be comprised by a head mounted display.

In some circumstances, information displayed on a see through display may obscure one or more objects from the user when perceived through the see through display. In at least one example embodiment, obscurance may be causation of obscuring. For example, display of information 503 on display 502 may cause obscurance of the display area of display 502 associated with information 503. In this manner, information 503 may be associated with obscurance of a display area associated with the see through display.

FIG. 5B is a diagram illustrating a see through display according to at least one example embodiment. In at least one example embodiment, a see through display is a near eye display. A near eye display may be a see through display that is positioned proximate to an eye of the user. The example of FIG. 5B illustrates glasses that comprise a near eye display in each lens. In the example of FIG. 5B, the right near eye display is displaying information 513A and 514A, and the left near eye display is displaying information 513B and 514B. In at least one example embodiment, information 513A may be associated with information 513B. For example, the content of information 513A may be identical to content of information 513B. In some circumstances, even though the content may be identical between 513A and 513B, position of information 513A on the right near eye display may vary from position of information 513B on the left near eye display. In this manner, the apparatus may vary position of information between the left near eye display and right near eye display to vary the parallax of the information perceived by the user. In this manner, the apparatus may vary the perceived depth of the information by the user.

Due to the nature of a head mounted display, in some circumstances, a user may desire to avoid display of information on the head mounted display that may distract the user. For example, information displayed on a head mounted display may obscure one or more objects from the user when perceived through the head mounted display. In such an example, the user of the head mounted display may desire to avoid being distracted by information displayed on, at least part of, the head mounted display in situations in which the user desires to avoid obscurance of objects the user may be able to view through the head mounted display. For example, in social situations, business situations, driving situations, and/or the like, the user may desire to avoid potentially obscuring information from being displayed on the head mounted display.

In many situations, the user may desire to avoid distractions associated with display of information on a head mounted display, to avoid interruption of ongoing activities by information being displayed on a head mounted display, and/or the like. In at least one example embodiment, an apparatus may preclude display of information on a head mounted display worn by a user. For example, the apparatus may preclude display of information on the head mounted display worn by the user until certain input is received, until an indication of intent is received, in certain situations that may be detectable by the apparatus, and/or the like. In at least one example embodiment, an apparatus may default to preclusion of display of information on the head mounted display absent an indication to the contrary. For example, the apparatus may preclude display of information on the head mounted display unless such display is initiation by a user of the head mounted display, indicated by a user of the head mounted display, and/or the like. In at least one example embodiment, display of information is precluded on less than the entirety of a head mounted display. For example, display of information may be precluded in a center portion of the head mounted display, a user configurable region of the head mounted display, and/or the like. For example, display of information may be precluded in a center ninety-percent of a head mounted display such that information may be displayed along the periphery of the head mounted display. In such an example, the periphery display area may be utilized for display of status indicator, battery graphics, wireless connectivity, time, notifications, and/or the like. In another example, display of information may be precluded in a center seventy-percent of a head mounted display. In both examples, display of information may be precluded in one region and permitted in another region in order to avoid display of information in a distracting and/or obstructing manner.

In some circumstances, a user may desire to view information by way of a head mounted display. For example, the user may desire the head mounted display to discontinue preclusion of display of information on the head mounted display, to allow display of information on the head mounted display, and/or the like. In at least one example embodiment, the apparatus causes display of information on a head mounted display that is worn by a user. The information may be any sort of visual element, including text, interactive elements, graphics, and/or the like. In at least one example embodiment, the causation of display of information causes display of the information at a position on the head mounted display. For example, the apparatus may cause display of the information at a center position of the head mounted display. A center position of a display may be a position on the display that is at the center of a field of view of a user when the user's eyes are oriented in a centered eye orientation. In many circumstances, a user may desire to interact with a head mounted display in a manner that avoids potentially cumbersome tactile interactions, avoids fumbling with the head mounted display, permits ongoing activities to continue in parallel with interactions with the head mounted display, permits free use of the user's hands while interacting with the head mounted display, and/or the like. For example, the user may desire to interact with the user's head mounted display by utilizing eye movements, head movements, body movements, and/or the like.

In many circumstances, it may be desirable for the apparatus to determine whether a user is likely to be viewing information that is displayed on a head mounted display or viewing objects through the head mounted display. For example, if the user is viewing information that is displayed on the head mounted display, the user may desire the information to be prominent on the head mounted display. In this manner, the user may be able to perceive the information displayed on the head mounted display more efficiently. In another example, if the user is viewing an object that can be seen through the head mounted display, the user may desire the information to be less prominent. In this manner, the user may be able to perceive the object with less obstruction from displayed information, if any, on the head mounted display.

Vestibulo-ocular reflexes (VORs) are the reflex movements our eyes make in order to keep what we are looking at stable on the retina while we are moving. When moving their head, if the user is looking through a head mounted display at the physical world, they will perform VORs. However, when the user is looking at information displayed on the head mounted display while moving their head, the user's eyes do not perform VORs, because the head mounted display moves along with the user's head, and the displayed information does not significantly move with respect to the user's eyes. Thus, it may be deduced whether a user is looking through a head mounted display or at information displayed on the head mounted display based on whether the user is performing VORs. VORs may be detected by monitoring the user's eye movements as they move their head. For example, if a person is viewing an object through the head mounted display, the person may move his eyes upward as the person moves his head downward to allow his eyes to remain directed toward a particular object. Conversely, if a user is viewing information displayed on a head mounted display, the head mounted display may be mounted on the head of the user in a manner such that the head mounted display moved with the head of the user. In such circumstances, the user may continue to view particular information absent any eye movement that corresponds with any head movement. For example, if a user is viewing information on a head mounted display, and the user moves his head, the user may continue viewing the information on the head mounted display without necessarily moving his eyes. In this manner, the correlation of the eye movement and the head movement of the user may indicate whether a user may be viewing information displayed on the head mounted display. In this manner, it may be desirable to determine whether eye movement information and head movement information are consistent with a user viewing information on the head mounted display, to determine whether eye movement information and head movement information are inconsistent with a user viewing information on the head mounted display, and/or the like.

In at least one example embodiment, the apparatus receives eye movement information associated with the user. Eye movement information may refer to information indicative of one or more eye movements. For example, the apparatus may receive the eye movement information from at least one memory, from another apparatus, from one or more sensors configured to sense an eye orientation of the user, and/or the like. In at least one example embodiment, eye movement information is eye movement sensor information. For example, the eye movement sensor information may provide information indicative of an orientation of the sensed eye, provide information indicative of movement of the sensed eye, and/or the like. In at least one example embodiment, eye movement sensor information may be information received from an optical sensor, an imaging sensor, a magnetometer sensor, a sensor configured to sense information associated with an orientation of an eye, a sensor configured to sense information associated with a movement of the eye, and/or the like. For example, one or more sensors may be utilized to sense information indicative of an eye movement, an eye orientation, and/or the like. In at least one example embodiment, an apparatus determines eye movement information. For example, the apparatus may determine, calculate, extrapolate, infer, and/or the like eye movement information based, at least in part, on the eye movement sensor information. In at least one example embodiment, eye movement information comprises information indicative of eye deviation direction. In at least one example embodiment, eye movement information comprises information indicative of the magnitude of the eye movement.

In at least one example embodiment, the apparatus receives head movement information associated with the user. Head movement information may refer to information indicative of one or more head movements. For example, the apparatus may receive the head movement information from at least one memory, from another apparatus, from one or more sensors configured to sense a head orientation of the user, and/or the like. In at least one example embodiment, head movement information is head movement sensor information. For example, the head movement sensor information may provide information indicative of an orientation of the sensed head, provide information indicative of movement of the sensed head, and/or the like. In at least one example embodiment, head movement sensor information may be information received from a magnetometer sensor, a gyroscope sensor, an accelerometer sensor, an orientation sensor, a myoelectric sensor, an optical sensor, an imaging sensor, a sensor configured to sense information associated with a movement of a head, and/or the like. For example, one or more sensors may be utilized to sense information indicative of a head movement, a head orientation, and/or the like. In at least one example embodiment, an apparatus determines a head movement of the user. For example, the apparatus may determine, calculate, extrapolate, infer, and/or the like head movement information based, at least in part, on the head movement sensor information. In at least one example embodiment, head movement information comprises information indicative of head deviation direction. In at least one example embodiment, head movement information comprises information indicative of the magnitude of the head movement.

In many circumstances, it may be desirable for an apparatus to determine if a user has discontinued viewing the information on a head mounted display. For example, if the apparatus determines that a user had discontinued viewing the information on the head mounted display, the apparatus may decrease the prominence of at least a portion the information on the head mounted display, and/or the like. To facilitate determination that a user has discontinued viewing information on a head mounted display, it may be desirable to evaluate an eye movement in relation to a head movement. For example, many circumstances exist where an eye movement and a head movement are inconsistent with the user viewing the information on the head mounted display. For instance, a head deviation direction opposite to an eye deviation direction may be inconsistent with the user viewing the information on the head mounted display. As previously described, such head movement and eye movement may be consistent with the user viewing an object that may be seen though the head mounted display. In at least one example embodiment, the apparatus determines that eye movement information and head movement information are inconsistent with the user viewing the information on the head mounted display.

In at least one example embodiment, the determination that the eye movement information and the head movement information are inconsistent with the user viewing the information on the head mounted display comprises determination that a head deviation direction is opposite to an eye deviation direction. For example, the apparatus may determine that the head deviation direction is a downward head deviation direction, similar as described regarding FIG. 3A, which is opposite an eye deviation direction characterized by an elevation of the eye, similar as described regarding FIG. 4B. In such an example, the apparatus may determine that the downward head deviation direction and the elevation eye deviation direction are inconsistent with the user viewing information on the head mounted display. In at least one example embodiment, the determination that they eye movement information and the head movement information are inconsistent with the user viewing the information on the head mounted display comprises determination that a magnitude of the eye movement is proportional to a magnitude of the head movement. For example, the apparatus may determine the distance of the eye movement is proportional to a distance of the head movement. In this manner, the apparatus may determine that such proportionality is indicative of the user maintaining an eye direction towards an object that may be viewed through the head mounted display. In another example, the apparatus may determine that the angle of the eye movement is proportional to the angle of the head movement. In this manner, the apparatus may determine that such proportionality is indicative of the user maintaining an eye direction towards an object that may be viewed through the head mounted display. In at least one example embodiment, the determination that the eye movement information and the head movement information are inconsistent with the user viewing the information on the head mounted display comprises determination that the eye movement information is consistent with an offset of a head movement indicated by the head movement information. The offset of the head movement may refer to a gaze direction of the eye of the user prior to receipt of the head movement information and receipt of the eye movement information being substantially similar to a gaze direction of the eye of the user subsequent to receipt of the head movement information and receipt of the eye movement information. Substantially similar may refer to any deviation in the gaze direction being within a gaze direction tolerance. For example, minor fluctuations in gaze direction may be consistent with viewing the same object through the head mounted display. Such minor fluctuations in gaze direction may be considered as being within a gaze direction tolerance. The gaze direction tolerance may be an adjustable setting configured by the user, a predetermined setting, and/or the like.

In some circumstances, it may be desirable to determine that the eye movement information and the head movement information are inconsistent with the user viewing information on the head mounted display independent of object tracking information. For example, gaze tracking of the eye and tracking objects in the user's field of view through a head mounted display may involve additional processing overhead, additional power consumption from a front facing camera, and/or the like. In at least one example embodiment, the determination that the eye movement information and the head movement information are inconsistent with the user viewing information on the head mounted display is independent of object tracking information. In at least one example embodiment, the determination that the eye movement information and the head movement information are inconsistent with the user viewing information on the head mounted display excludes object tracking information. In at least one example embodiment, the determination that the eye movement information and the head movement information are inconsistent with the user viewing information on the head mounted display excludes correlation between object tracking information and gaze tracking information.

In at least one example embodiment, the apparatus causes a decrease of the prominence of the information on the head mounted display based, at least in part, on the determination that the eye movement information and the head movement information are inconsistent with the user viewing the information on the head mounted display. The decrease in prominence may be similar as described regarding FIGS. 6A-6F. In this manner, the apparatus may avoid intrusiveness of displayed information in circumstances where the eye movement information and the head movement information are inconsistent with the user viewing such displayed information on the head mounted display.

In many circumstances, it may be desirable for an apparatus to determine if a user has resumed viewing information on a head mounted display. For example, if the apparatus determines that a user has resumed viewing the information on the head mounted display, the apparatus may cause display of at least a portion the information on the head mounted display, increase the prominence of at least a portion the information on the head mounted display, and/or the like. To facilitate determination that a user has resumed viewing information on a head mounted display, it may be desirable to evaluate another eye movement in relation to another head movement. For example, many circumstances exist where an eye movement and a head movement are consistent with the user viewing the information on the head mounted display. For instance, absence of substantial eye movement may be consistent with the user viewing the information on the head mounted display. In at least one example embodiment, the apparatus receives eye movement information and receives head movement subsequent to a decrease of prominence of the information on the head mounted display. In at least one example embodiment, the apparatus determines that eye movement information and the head movement information are consistent with the user viewing the information on the head mounted display. In at least one example embodiment, the determination that the eye movement information and the head movement information are consistent with the user viewing the information on the head mounted display is based, at least in part, on absence of substantial eye movement. Absence of substantial eye movement may refer to any eye movement being within a threshold of insignificance. A threshold of insignificance may refer to a threshold of movement below which is consistent with viewing of the head mounted display. For example, minor fluctuations in eye orientation may be consistent with viewing the same information on the head mounted display. Such minor fluctuations in eye orientation may be considered an absence of substantial eye movement. In at least one example embodiment, the apparatus causes an increase of prominence of the information on the head mounted display based, at least in part, on the determination that the eye movement information and the head movement information are consistent with the user viewing the information on the head mounted display. The increase in prominence may be similar as described regarding FIGS. 6A-6F.

In many circumstances, it may be desirable for an apparatus to determine if a user is continuously viewing information on a head mounted display. For example, if the apparatus determines that a user is continuously viewing the information on the head mounted display, the apparatus may continue display of at least a portion the information on the head mounted display, retain the prominence of at least a portion the information on the head mounted display, and/or the like. To facilitate determination that a user has resumed viewing information on a head mounted display, it may be desirable to evaluate an eye movement in relation to a head movement. For example, during circumstances where an eye movement and a head movement are consistent with the user viewing the information on the head mounted display, the apparatus may determine that the user is continuously viewing the information on the display. In at least one example embodiment, the apparatus determines that the eye movement information and the head movement information are consistent with the user viewing the information on the head mounted display and retains the prominence of the information on the head mounted display based, at least in part, on the determination that the eye movement information and the head movement information are consistent with the user viewing the information on the head mounted display.

FIGS. 6A-6F are diagrams illustrating prominence of information displayed on a display according to at least one example embodiment. The examples of FIGS. 6A-6F are merely examples and do not limit the scope of the claims. For example, the display may vary, the information may vary, the prominence may vary, and/or the like.

When a user is viewing information on a display, the prominence of the information on the display may affect the user's perception of the information as well as the perception of objects viewable through the display. For example, the information may obscure objects viewable through the display when the information is positioned on the display such that the information is highly prominent. In many circumstances, it may be desirable to increase or decrease the prominence of information on a display. In at least one example embodiment, the apparatus decreases the prominence of information on a display. In at least one example embodiment, the apparatus increases the prominence of information on a display.

FIGS. 6A-6F illustrate a display region 600 of a display according to at least one example embodiment. For example, display region 600 may be a display region on a display similar as described regarding FIGS. 5A-5B. Display region 600 comprises center 610-634. It can be seen that the examples illustrated by FIGS. 6A-6F depict information 610 as a menu, information 612 as a document, and information 620, 622, 624, 630, 632, and 634 as icons. In many circumstances, information 610-634 may be different information. For example, information 612 may be a photograph, a video, a program window, and/or the like.

In some circumstances, it may be desirable to increase or decrease the prominence of a display by adjusting the visual permeability of the display. Visual permeability of the display may refer to a propensity for visual information to pass through the display to the eye of the user. For instance, in the example of FIG. 5A, the visual permeability of display 502 may refer to the propensity for visual information associated with object 505 to pass through display 502 to the eye of user 501. In circumstances where the user desires to view objects through the display, it may be desirable to increase the visual permeability of the display. For instance, in the example of FIG. 5A, it may be desirable in circumstances where user 501 wishes to view object 505 to increase the permeability of display 502 such that user 501 can easily view object 505 through display 502. In circumstances where the user desires to view information on the display, it may be desirable to decrease the visual permeability of the display. For instance, in the example of FIG. 5A, it may be desirable, in circumstances where user 501 wishes to view display information 503 and 505, to decrease the permeability of display 502 such that user 501 is not distracted by objects 505 and 506 through display 502. In at least one example embodiment, the decrease of prominence of the information on a display comprises causation of increase of visual permeability of, at least part of, the display. In at least one example embodiment, visual permeability of the display refers to a propensity for visual information to pass through the display to the eye of the user with regard to the information displayed on the display.

Figure 6A:
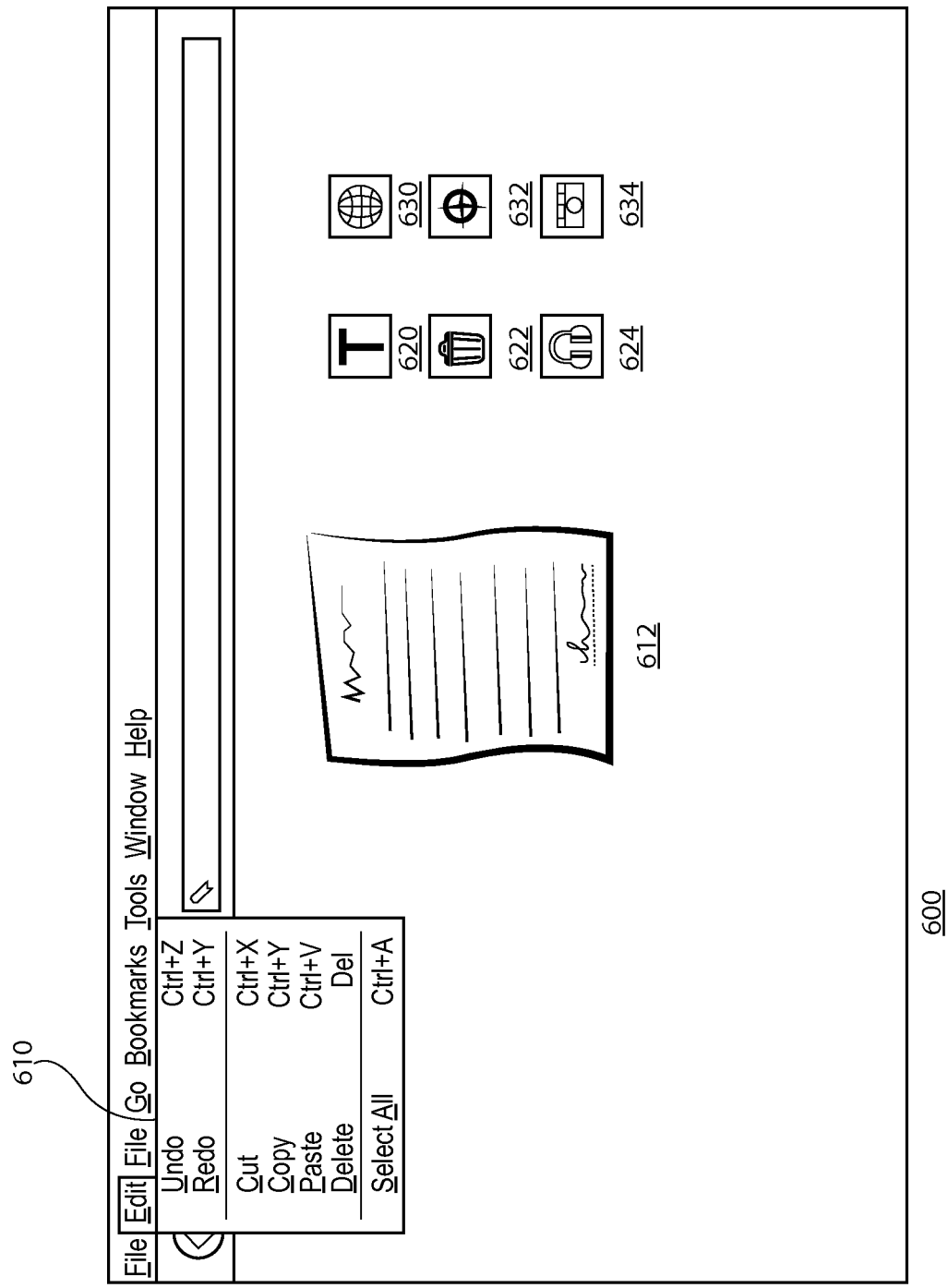
FIGS. 6A-6F are diagrams illustrating prominence of information displayed on a display according to at least one example embodiment.
Figure 6B:
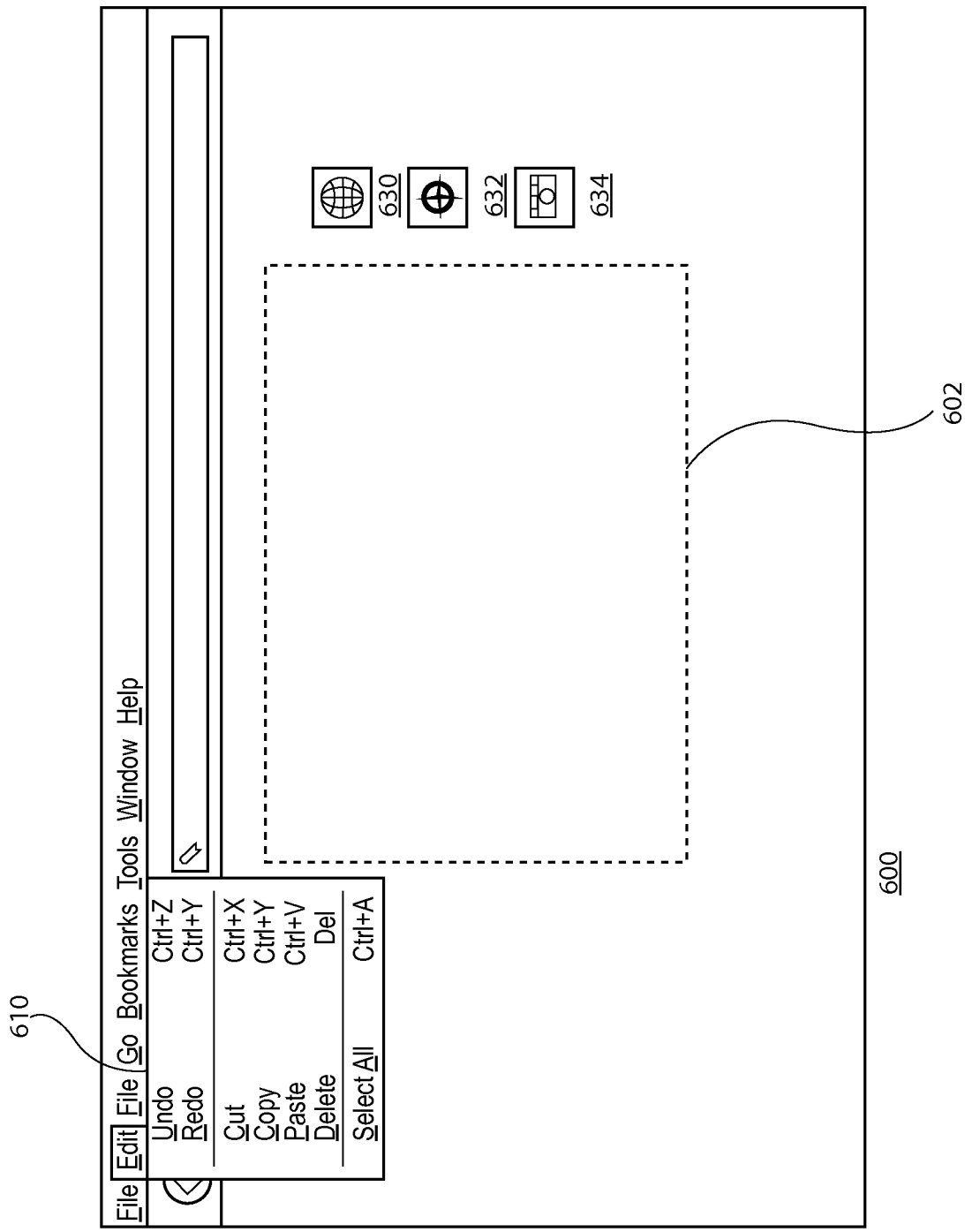
Figure 6C:
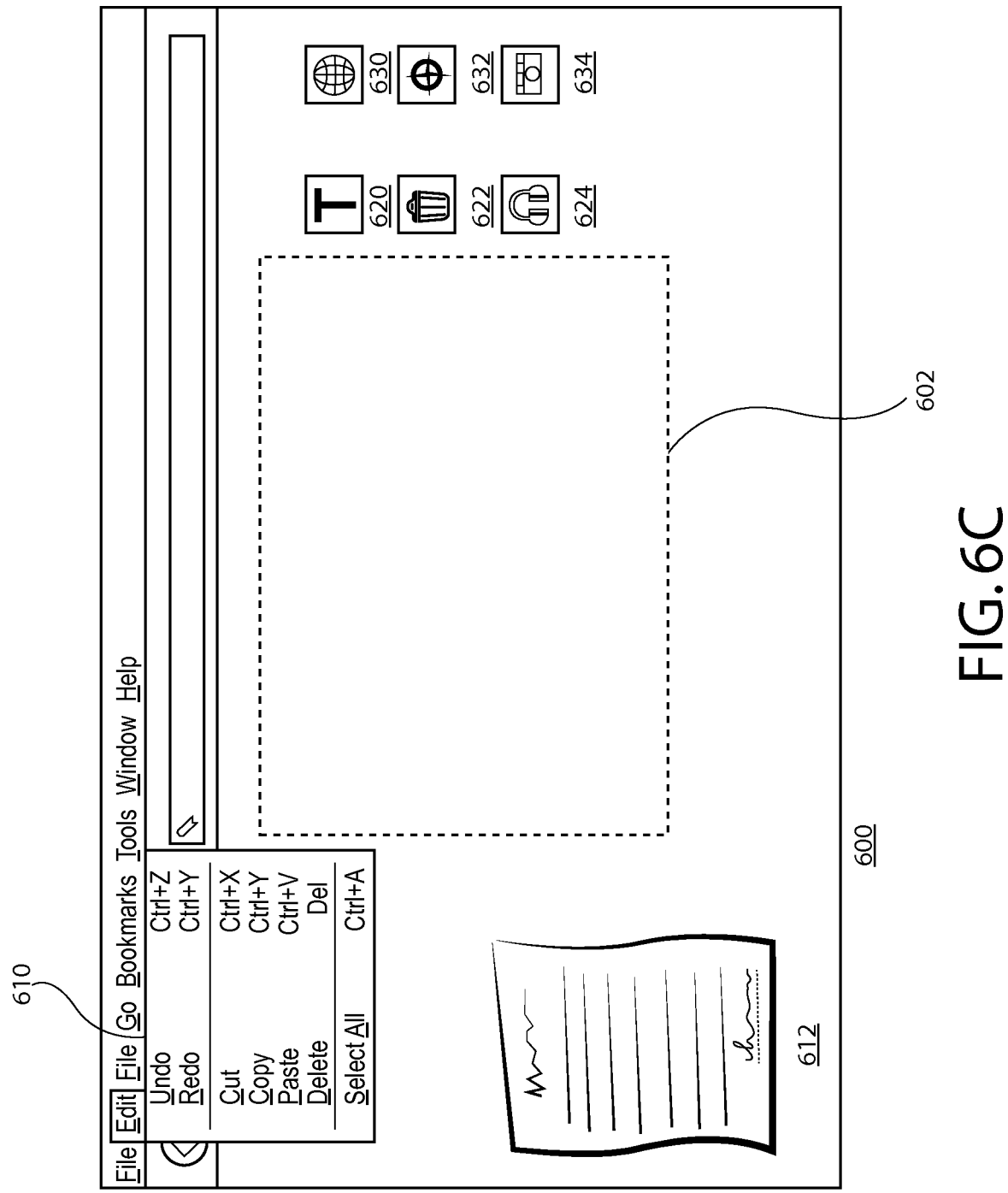
Figure 6D:
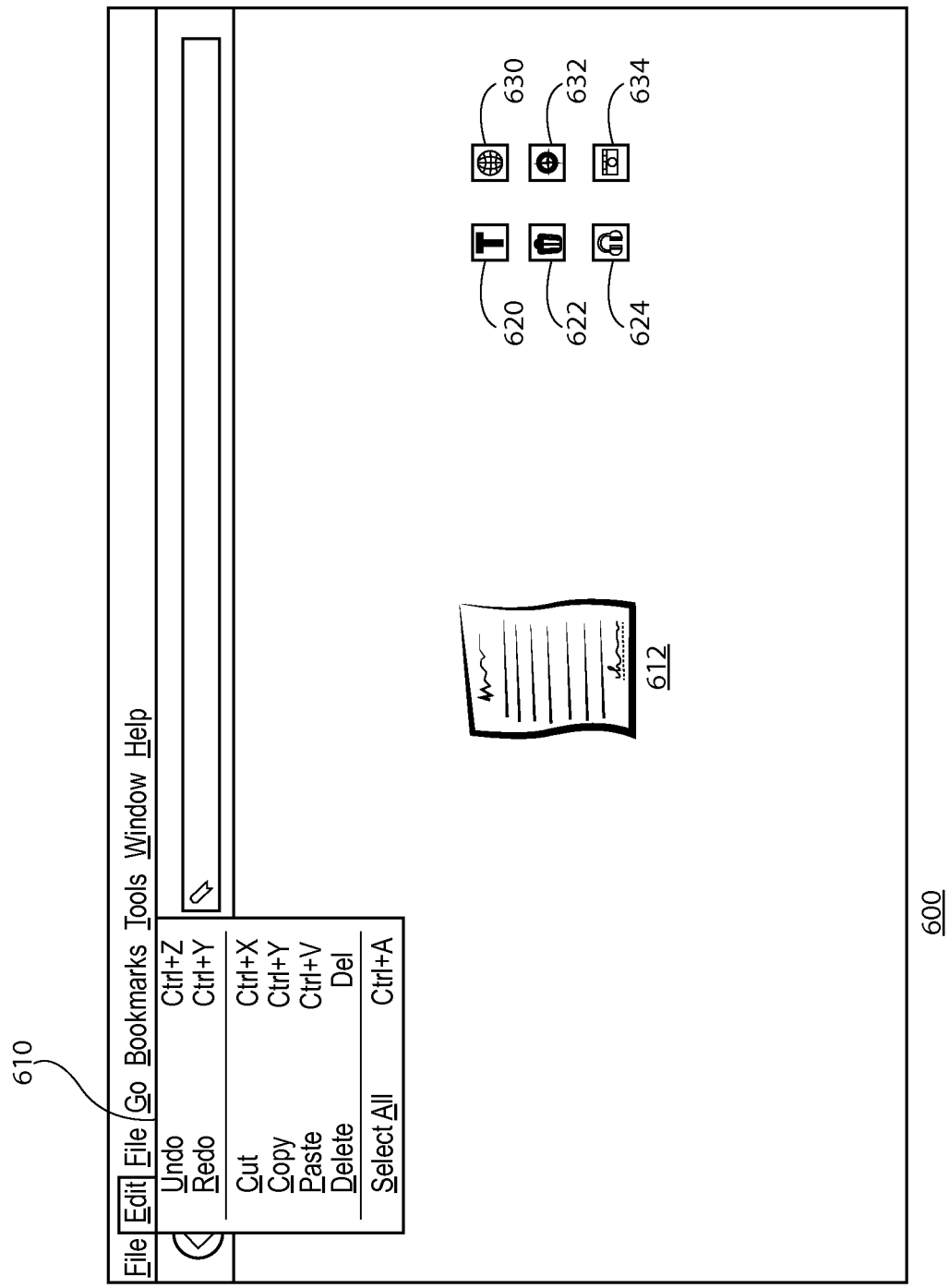
Figure 6E:
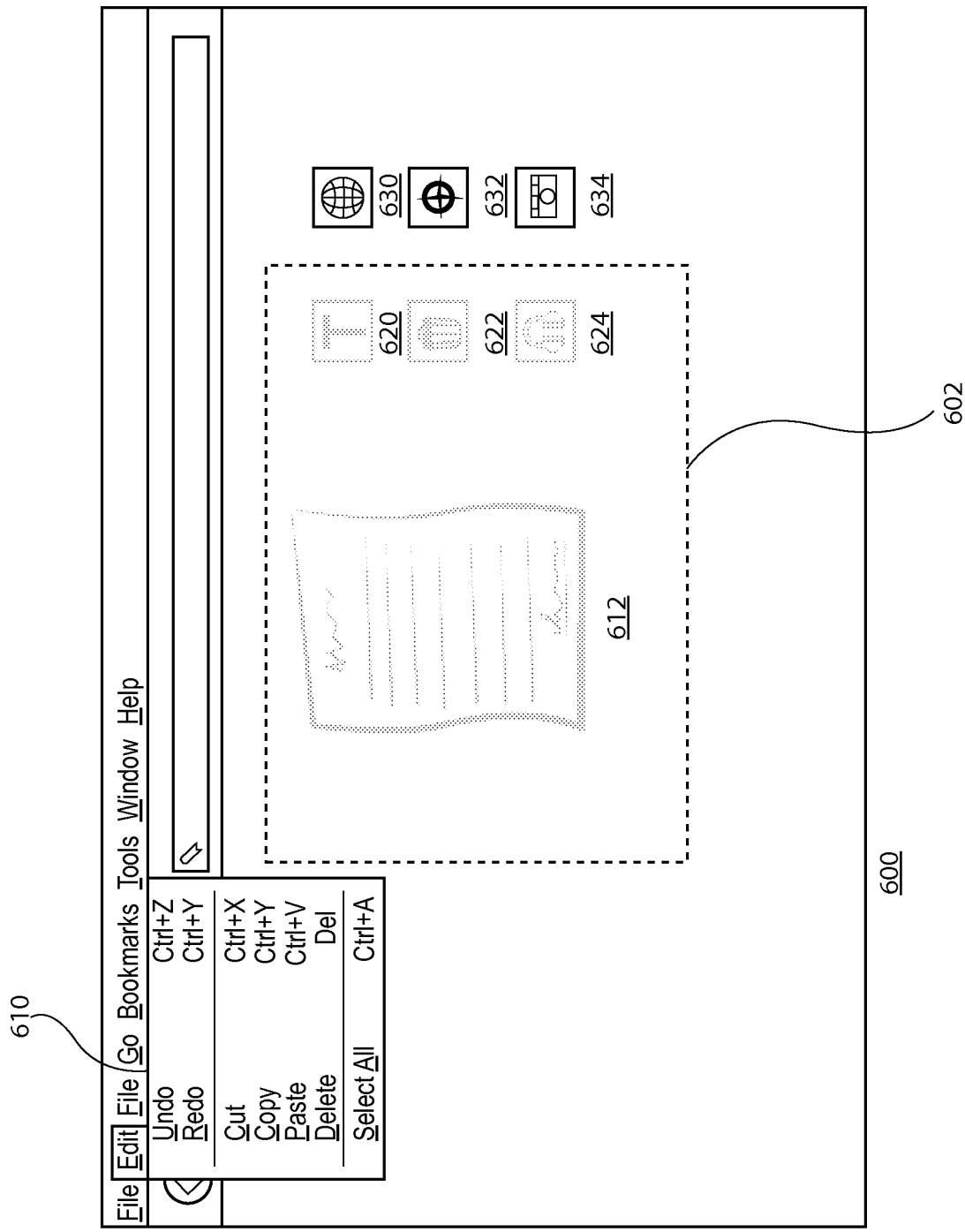

In at least one example embodiment, the decrease of prominence of the information on the display comprises causation of increase of visual permeability of a center region of the display. For example, an apparatus may increase the visual permeability of a center region of display 502 of FIG. 5A. FIGS. 6B, 6C, and 6E illustrate center region 602 of display region 600. A center region of a display may refer to a sub-region of a display region, such that the sub-region is bounded by the remainder of the display region. For instance, it can be seen in FIGS. 6B, 6C and 6E that center region 602 is bounded by the remainder of display region 600. It can be seen that center region 602 is a sub-region of display region 600 at a position approximately at the geometric center of display region 600. In some circumstances the size, shape, and/or position of a center may vary. For example, a center region may be larger or smaller than center region 602, may be curved, round, oval, located at a position other than the geometric center of a display region, and/or the like. A center region may include a center position of the display. In at least one example embodiment, the decrease of prominence of the information on the display comprises causation of increase of visual permeability the information displayed on the display. In at least one example embodiment, the increase of prominence of the information on a display comprises causation of decrease of visual permeability of, at least part of, the display. In at least one example embodiment, the increase of prominence of the information on the display comprises causation of decrease of visual permeability of a center region of the display. In at least one example embodiment, the increase of prominence of the information on the display comprises causation of decrease of visual permeability the information displayed on the display.

In some circumstances, it may be desirable to increase or decrease the brightness of the information displayed on the display. For instance, it may be desirable to or decrease the brightness of information 503 on display 502 of FIG. 5A. For example, decreasing the brightness of information may present the information in a manner that is less distracting to the user when the user is viewing other information, such as object 505. Increasing the brightness of information may present the information in a manner that induces greater user attention. For example, increasing the brightness of information 503 may induce greater attention of user 501. Brightness of information may refer to the luminance of the information on a display. For example, increasing the brightness of information on a display may cause the user to perceive the information as having more luminance than other information on the display that has not had its brightness increased, having more luminance than the information previously had, and/or the like. Decreasing the brightness of information on a display may cause the user to perceive the information as having less luminance than other information on the display that has not had its brightness decreased, having less luminance than the information previously had, and/or the like.

In at least one example embodiment, the decrease of prominence of the information on the display comprises causation of a decrease of a brightness of, at least part of, the information. For example, an apparatus may decrease the brightness of information 503 on display 502 of FIG. 5A. In at least one example embodiment, the decrease of the brightness of the part of the information comprises decrease of the brightness of the part of the information that corresponds with a center region of the display. For example, the decrease of brightness may correspond with information appearing in center region 602 of display region 600 of FIGS. 6B, 6C, and 6E. In at least one example embodiment, the decrease of prominence of the information on the display comprises causation of a decrease of a brightness of an entirety of the information. In at least one example embodiment, the decrease of prominence of the information on the display comprises causation of a decrease of a brightness of, at least part of, the information. In at least one example embodiment, the increase of the brightness of the part of the information comprises increases of the brightness of the part of the information that corresponds with a center region of the display. For example, the increase of brightness may correspond with information appearing in center region 602 of display region 600 of FIGS. 6B, 6C, and 6E. In at least one example embodiment, the increase of prominence of the information on the display comprises causation of an increase of a brightness of an entirety of the information.

In some circumstances, it may be desirable to terminate display of at least part of the information. For example, in circumstances where the display is a see through display, the information may obscure an object the user desires to view through the display. For instance, in the example illustrated by FIG. 5A, information 504 may obscure user 501's view of object 505 through display 502. In at least one example embodiment, the decrease of prominence of the information on the display comprises termination of display of at least part of the information. In at least one example embodiment, the termination of display of at least part of the information comprises termination of display of a part of the information that corresponds with a center region of the display. For example, the display may be displaying information similar as illustrated by FIG. 6A. The apparatus may terminate display of information 612-624 such that the display region displays information similar as illustrated in FIG. 6B. It can be seen in FIG. 6B that information 612-624 is absent from center region 602. In at least one example embodiment, the decrease of prominence of the information on the display comprises termination of display of an entirety of the information. For example, the apparatus may terminate display of all information on a display, such that the display is absent information.

Oftentimes, an apparatus may cause display of information at a position on a display. For instance, in the example illustrated in FIG. 5A, an apparatus may cause display of information 503 at a position on display 502. In some circumstances it may be desirable to move the information on the display from the position to a different position. For example, user 501 may find that the position of information 503 distracts the user from viewing object 505 through display 502. User 501 may find that information 503 is less distracting at a different position on display 502. In at least one example embodiment, the decrease of prominence of the information on a display comprises movement of the information from a position on the display to a different position on the display. For instance, in the example illustrated in FIG. 6A, information 612, information 620, information 622, information 624, information 630, information 632, and information 634 are displayed at a particular positions on display region 600. The apparatus may move each of information 612, information 620, information 622, information 624, information 630, information 632, and information 634 such that information 612, information 620, information 622, information 624, information 630, information 632, and information 634 are displayed at a different positions on display region 600. For example, information 612, information 620, information 622, information 624, information 630, information 632, and information 634 may be displayed at their positions as illustrated in FIG. 6C. It can be seen in FIG. 6C that center region 602 is absent information. In this manner, information 612-634 as illustrated in FIG. 6C may be less prominent to a user than information 612-634 as illustrated in FIG. 6A. It can be seen in FIG. 6C that information 630, information 632, and information 634 may be moved relative to their positions with respect to information 620, information 622, and information 624. However, it should be understood that in some circumstances, information 630, information 632, and information 634 may retain their position. For example, information 630, information 632, and information 634 would not need to be moved from their position to cause center region 602 to become absent of information.

In some circumstances, the movement of the information may comprise a termination of display of the information at the position and causing display of the information at the different position. For instance, in the example of FIG. 5A, an apparatus may terminate the display of information 503 and cause display of information 503 at a different position on display 502.

In at least one example embodiment, the different position on the display is further from a center position of the display than the position on the display. In at least one example embodiment, the increase of prominence of the information on a display comprises movement of the information from a position on the display to a different position on the display. For instance, in the example illustrated in FIG. 6C, information 612 is displayed at a position on display region 600. The apparatus may move information 612 such that it is displayed at a different position on display region 600. For example, information 612 may appear at its position as illustrated in FIG. 6A. It can be seen in FIG. 6A that information 612 is at a position closer to the geometric center of display region 600 than the position of information 612 as illustrated in FIG. 6C. In this manner, information 612 may be more prominent to a user than if information 612 appeared at the position illustrated in FIG. 6C. In at least one example embodiment, the different position on a display is nearer to a center position of the display than the position on the display.

In some circumstances, a user may desire to view a smooth transition of display of information at a position on a head mounted display to display of the information at a different position on the head mounted display. For example, the user may desire display of the information to move fluidly from the position to the different position in such a way that allows for the user to naturally and comfortably follow the repositioning of the information, to continue viewing of the information during the repositioning, and/or the like. In at least one example embodiment, an apparatus causes display of an animation indicating progression of display of a representation of a part of information from a position to a different position on a head mounted display, to another position that is closer to a center position of a head mounted display, to a center position on a head mounted display, and/or the like. In order to facilitate such a fluid repositioning of the information on the head mounted display, a user may desire to have display of the information terminated at the position and caused to be displayed at the different position, at another position that is closer to a center position, at a center position, and/or the like. In at least one example embodiment, an apparatus causes termination of display of at least a part of a representation of information at a position on a head mounted display.

In some circumstances, it may be desirable to decrease a size of the information that is displayed on a display. For example, the size of the information on the display may distract the user from viewing objects through the display. For instance, in the example of FIG. 5A, the size of information 503 may distract user 501 from viewing object 505 through display 502. A decrease of a size the information may refer to displaying the information in a manner such that it takes up less area on a display. For example, on a display that utilizes of pixels, the information may be displayed in an area that is ten pixels high by ten pixels wide. A decrease of the size of the information may cause the information to be displayed in an area that is five pixels high by five pixels wide. In at least one example embodiment, the decrease of prominence of the information on the display comprises causation of a decrease of a size of, at least part of, the information. For instance, in the example illustrated in FIG. 6A, information 610-634 are displayed to have a particular size. The apparatus may decrease the size of information 610-634 of FIG. 6A such that information 610-634 of FIG. 6D is displayed at a different size. It can be seen that information 610-634 is decreased in size in FIG. 6D relative to FIG. 6A. In this manner, information 610-634 of FIG. 6D may be less prominent to a user than information 610-634 of FIG. 6A. In at least one example embodiment, the decrease of the size of the part of the information comprises decrease of the size of the part of the information that corresponds with a center region of the display. For example, the apparatus may cause a decrease in the size of information 612-624 while maintaining the current size of information 610 and information 630-634. In at least one example embodiment, the decrease of prominence of the information on the display comprises causation of a decrease of a size of an entirety of the information.

In some circumstances, it may be desirable to increase a size of the information that is displayed on a display. For example, increasing a size of the information may help to draw the user's attention to the information that was increased in size. For instance, in the example of FIG. 5A, increasing the size of information 503 may draw the attention of user 501 to information 503. An increase of a size the information may refer to displaying the information in a manner such that it takes up more area on a display. For example, on a display comprised of pixels, the information may be displayed in an area that is five pixels high by five pixels wide. An increase of the size of the information may cause the information to be displayed in an area that is ten pixels high by ten pixels wide. In at least one example embodiment, the increase of prominence of the information on the display comprises causation of an increase of a size of, at least part of, the information. For instance, in the example illustrated in FIG. 6C, information 610-634 is displayed to have a size. The apparatus may increase the size of information 610-634 of FIG. 6D such that information 610-634 is displayed at a different size. It can be seen that information 610-634 is increased in size in FIG. 6A relative to FIG. 6D. In this manner, information 610-634 of FIG. 6A may be more prominent to a user than information 610-634 of FIG. 6C. In at least one example embodiment, the increase of the size of the part of the information comprises increase of the size of the part of the information that corresponds with a center region of the display. For example, the apparatus may cause an increase in the size of information 612-624 while maintaining the current size of information 610 and information 630-634. In at least one example embodiment, the increase of prominence of the information on the display comprises causation of an increase of a size of an entirety of the information.

In some circumstances, it may be desirable to increase the transparency of the information on a display. For example, objects viewed through the display may be more visible when the information on the display is more transparent. Transparency of information on a display may refer to a physical property of the information on the display such that light may travel through the information on the display in a manner that allows a user to perceive at least part of an object through the information. For example, an object appearing behind information on a display in which the information is highly transparent may be observable to a user viewing the object through the information. In at least one example embodiment, the decrease of prominence of the information on the display comprises causation of an increase of a transparency of, at least part of, the information. An increase in transparency of the information may refer to a physical property of the information such that more light may pass through the information than may pass through the information before the transparency is increased. In at least one example embodiment, the increase of the transparency of the part of the information comprises increase of the transparency of the part of the information that corresponds with a center region of the display. For instance, information 610-634 may be displayed on display region 600 at a transparency level similar as illustrated on FIG. 6A. The apparatus may increase the transparency of information 612-624 while maintaining the transparency level of information 610 and information 630-634 such that information 612-624 are displayed with a higher amount of transparency relative to information 610 and information 630-634. Such an example is illustrated in FIG. 6E. It can be seen in FIG. 6E that information 612-624 corresponds with center region 602. In this manner, information 612, information 620, and information 624 may be less prominent than information 610, information 630, information 632, and information 634. Similarly, information 612, information 620, and information 624 of FIG. 6E may be less prominent than information 612, information 620, and information 624 of FIG. 6A.

Figure 6F:
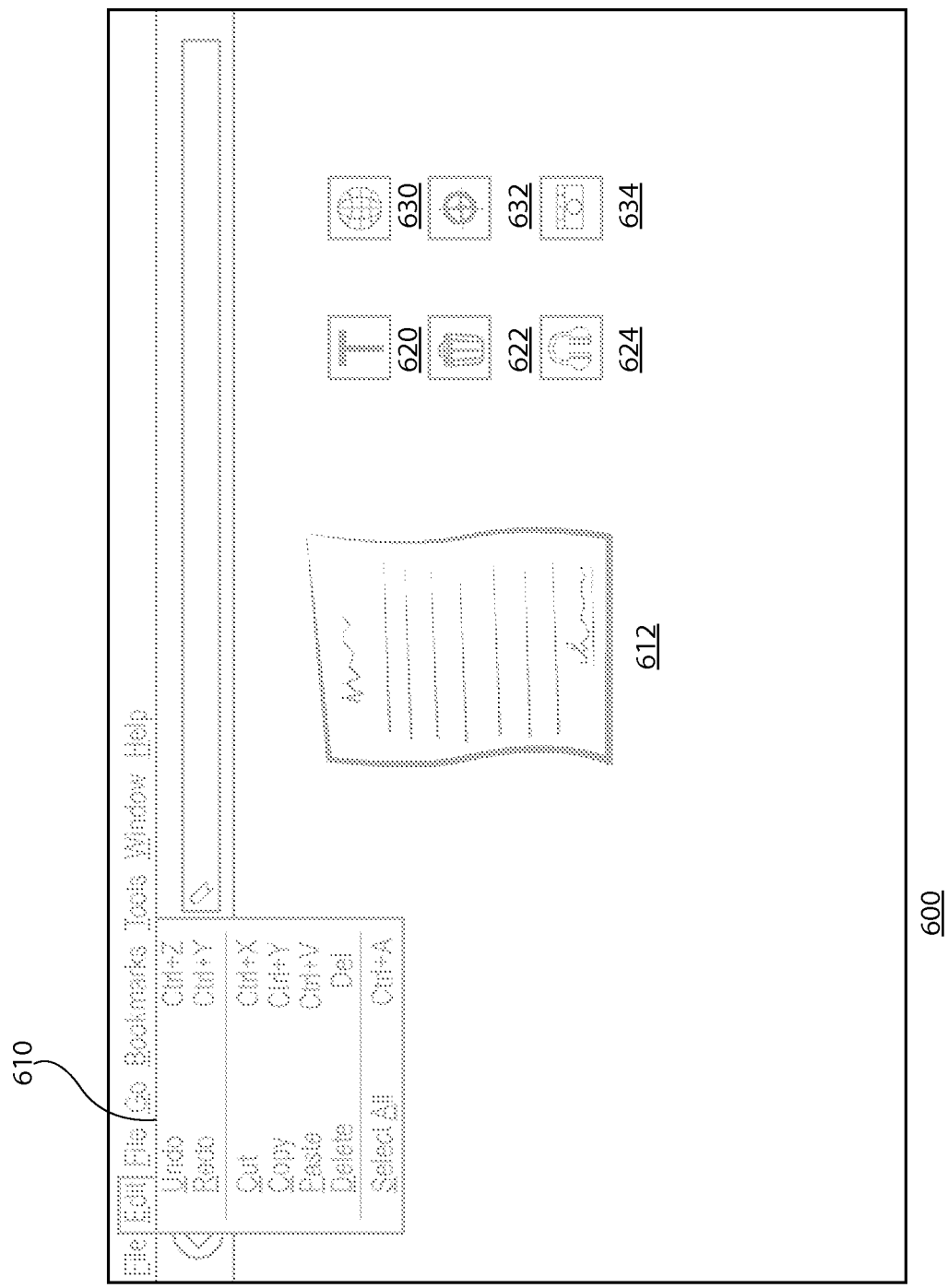

In at least one example embodiment, the decrease of prominence of the information on the display comprises causation of an increase of a transparency of an entirety of the information. For instance, information 610-634 may be displayed on display region 600 at a transparency level similar as illustrated on FIG. 6A. The apparatus may increase the transparency of information 610-634 such that information 610-634 is displayed with a higher amount of transparency, similar as illustrated in FIG. 6F. In this manner, information 610-634 may be less prominent to a user of the display.

In some circumstances, it may be desirable to decrease the transparency of the information on a display. For example, information on the display may be easier for a user to perceive when the information on the display is less transparent. In at least one example embodiment, the increase of prominence of the information on the display comprises causation of a decrease of a transparency of, at least part of, the information. A decrease in transparency of the information may refer to a physical property of the information such that less light may pass through the information than may pass through the information before the transparency is decreased. In at least one example embodiment, the decrease of the transparency of the part of the information comprises decrease of the transparency of the part of the information that corresponds with a center region of the display. For instance, information 610-634 may be displayed on display region 600 at a transparency level similar as illustrated on FIG. 6E. The apparatus may decrease the transparency of information 612-624 while maintaining the transparency level of information 610 and information 630-634 such that information 612-624 is displayed with a lower amount of transparency relative to information 610 and 630-634. It can be seen in FIG. 6E that information 612-624 corresponds with center region 602. In this manner, information 612, information 620, and information 624 may be more prominent than information 610, information 630, information 632, and information 634. Similarly, information 612, information 620, and information 624 of FIG. 6E may be more prominent than information 612, information 620, and information 624 of FIG. 6F.

In at least one example embodiment, the increase of prominence of the information on the display comprises causation of a decrease of a transparency of an entirety of the information. For instance, information 610-634 may be displayed on display region 600 at a transparency level similar as illustrated on FIG. 6F. The apparatus may decrease the transparency of information 610-634 such that information 610-634 is displayed with a different amount of transparency, similar as illustrated in FIG. 6A. In this manner, information 610-634 may be more prominent to a user of the display.

Figure 7:
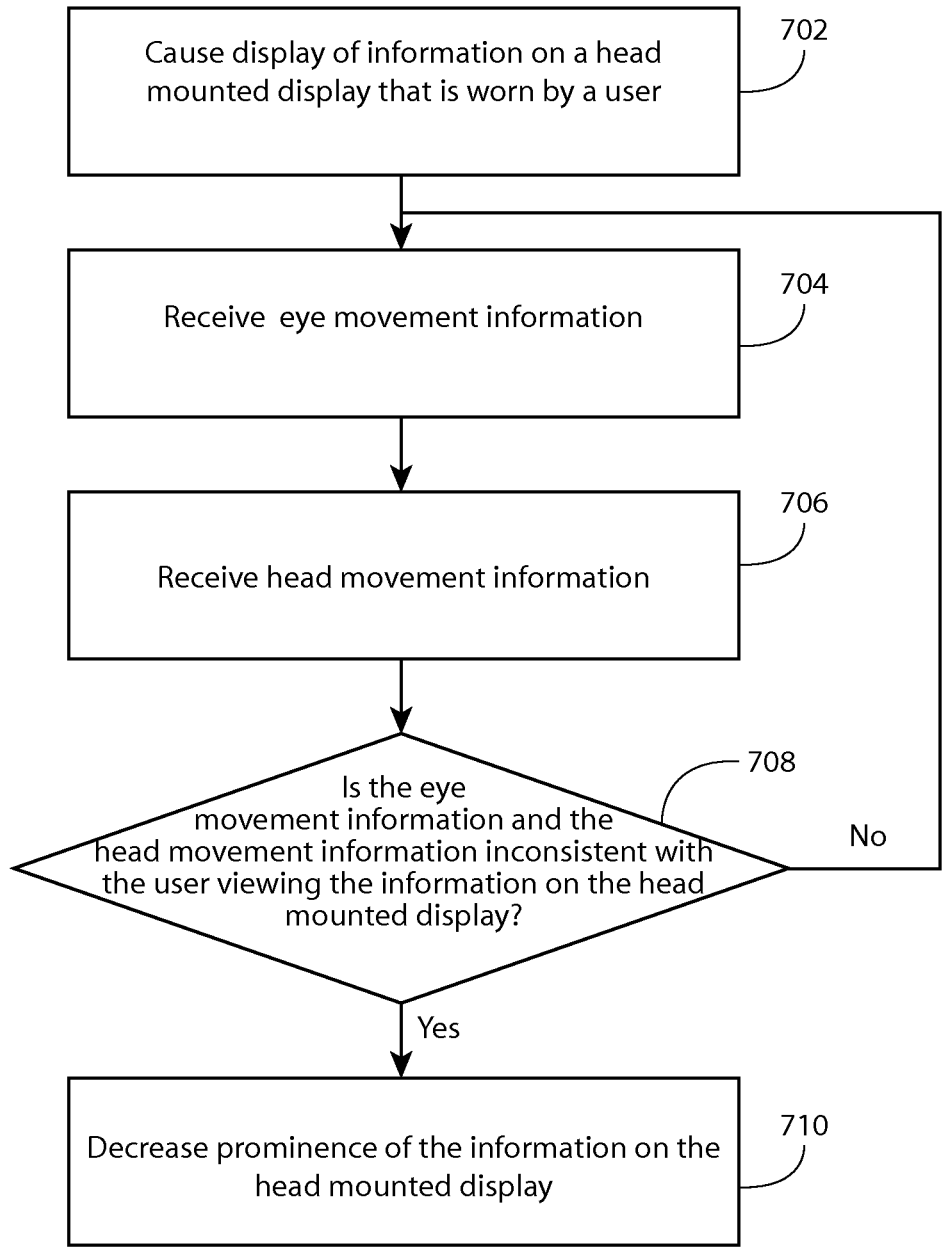
FIG. 7 is a flow diagram illustrating activities associated with causing display of information on a head mounted display that is worn by a user according to at least one example embodiment.

FIG. 7 is a flow diagram illustrating activities associated with causing display of information on a head mounted display that is worn by a user according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus causes display of information on a head mounted display that is worn by a user. The display, the information, the head mounted display, and the user may be similar as described regarding FIG. 2, FIGS. 5A-5B, and FIGS. 6A-6F.

At block 704, the apparatus receives eye movement information associated with the user. The receipt and the eye movement information may be similar as described regarding FIGS. 4A-4D and FIGS. 5A-5B.

At block 706, the apparatus receives head movement information associated with the user. The receipt and the head movement information may be similar as described regarding FIGS. 3A-3D and FIGS. 5A-5B.

At block 708, the apparatus determines whether the eye movement information and the head movement information are inconsistent with the user viewing the information on the head mounted display. The determination may be similar as described regarding FIGS. 5A-5B. If the apparatus determines that the eye movement information and the head movement information are inconsistent with the user viewing the information on the head mounted display, flow proceeds to block 710. If the apparatus determines that the eye movement information and the head movement information are consistent with the user viewing the information on the head mounted display, flow proceeds to block 704.

At block 710, the apparatus decreases prominence of the information on the head mounted display based, at least in part, on the determination that the eye movement information and the head movement information are inconsistent with the user viewing the information on the head mounted display. The decrease and the prominence of the information may be similar as described regarding FIGS. 5A-5B and FIGS. 6A-6F.

Figure 8:
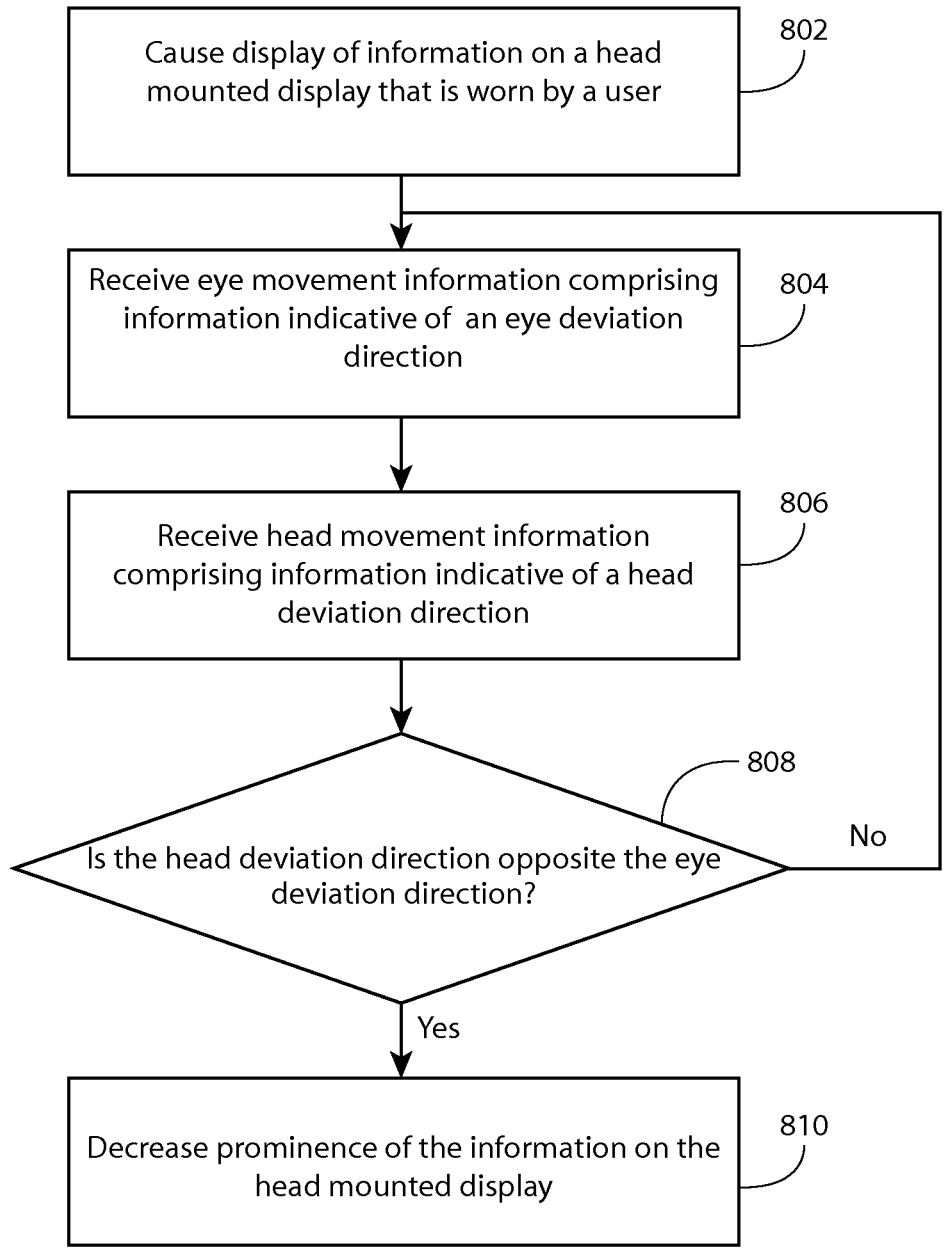
FIG. 8 is a flow diagram illustrating activities associated with causing display of information on a head mounted display that is worn by a user according to at least one example embodiment.

FIG. 8 is a flow diagram illustrating activities associated with causing display of information on a head mounted display that is worn by a user according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in some circumstances, it may be desirable for the apparatus to determine whether a head deviation direction is opposite an eye deviation direction. In this manner, the determination that the eye movement information and the head movement information are inconsistent with the user viewing the information on the head mounted display may be based, at least in part, on the determination that the head deviation direction is opposite the eye deviation direction.

At block 802, the apparatus causes display of information on a head mounted display that is worn by a user, similarly as described regarding block 702 of FIG. 7.

At block 804, the apparatus receives eye movement information associated with the user comprising information indicative of an eye deviation direction. The receipt, the eye movement information, and the eye deviation direction may be similar as described regarding FIGS. 4A-4D and FIGS. 5A-5B.

At block 806, the apparatus receives head movement information associated with the user comprising information indicative of a head deviation direction. The receipt, the head movement information, and the head deviation direction may be similar as described regarding FIGS. 3A-3D and FIGS. 5A-5B.

At block 808, the apparatus determines whether the eye movement information and the head movement information are inconsistent with the user viewing the information on the head mounted display comprising determination that a head deviation direction is opposite to an eye deviation direction. In this manner, the determination whether the eye movement information and the head movement information are inconsistent with the user viewing the information on the head mounted display may be based, at least in part, on the determination whether the head deviation direction is opposite to the eye deviation direction. At block 810, the apparatus decreases prominence of the information on the head mounted display, similarly as described regarding block 710 of FIG. 7.

Figure 9:
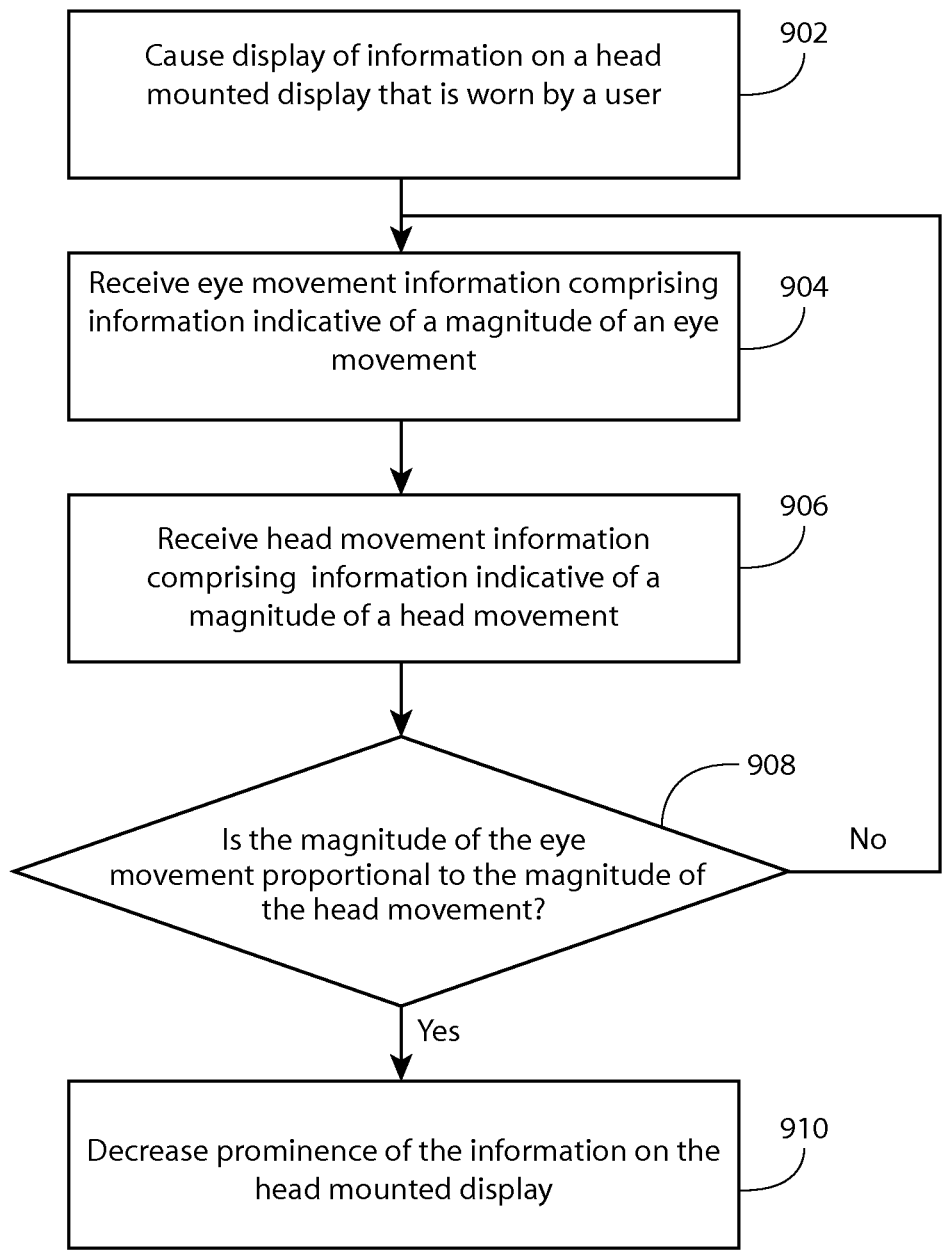
FIG. 9 is a flow diagram illustrating activities associated with causing display of information on a head mounted display that is worn by a user according to at least one example embodiment.

FIG. 9 is a flow diagram illustrating activities associated with causing display of information on a head mounted display that is worn by a user according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in some circumstances, it may be desirable for the apparatus to determine whether a magnitude of an eye movement is proportional to a magnitude of a head movement. In this manner, the determination that the eye movement information and the head movement information are inconsistent with the user viewing the information on the head mounted display may be based, at least in part, on the determination that the magnitude of the eye movement is proportional to the magnitude of the head movement.

At block 902, the apparatus causes display of information on a head mounted display that is worn by a user, similarly as described regarding block 702 of FIG. 7.

At block 904, the apparatus receives eye movement information associated with the user comprising information indicative of the magnitude of an eye movement. The receipt, the eye movement information, and the magnitude of the eye movement may be similar as described regarding FIGS. 4A-4D and FIGS. 5A-5B.

At block 906, the apparatus receives head movement information associated with the user comprising information indicative of a magnitude of the head movement. The receipt, the head movement information, and the magnitude of the head movement may be similar as described regarding FIGS. 3A-3D and FIGS. 5A-5B.

At block 908, the apparatus determines whether the eye movement information and the head movement information are inconsistent with the user viewing the information on the head mounted display comprising determination whether the magnitude of the eye movement is proportional to the magnitude of the head movement. In this manner, the determination whether the eye movement information and the head movement information are inconsistent with the user viewing the information on the head mounted display may be based, at least in part, on the determination whether the magnitude of the eye movement is proportional to the magnitude of the head movement. At block 910, the apparatus the apparatus decreases prominence of the information on the head mounted display, similarly as described regarding block 710 of FIG. 7.

Figure 10:
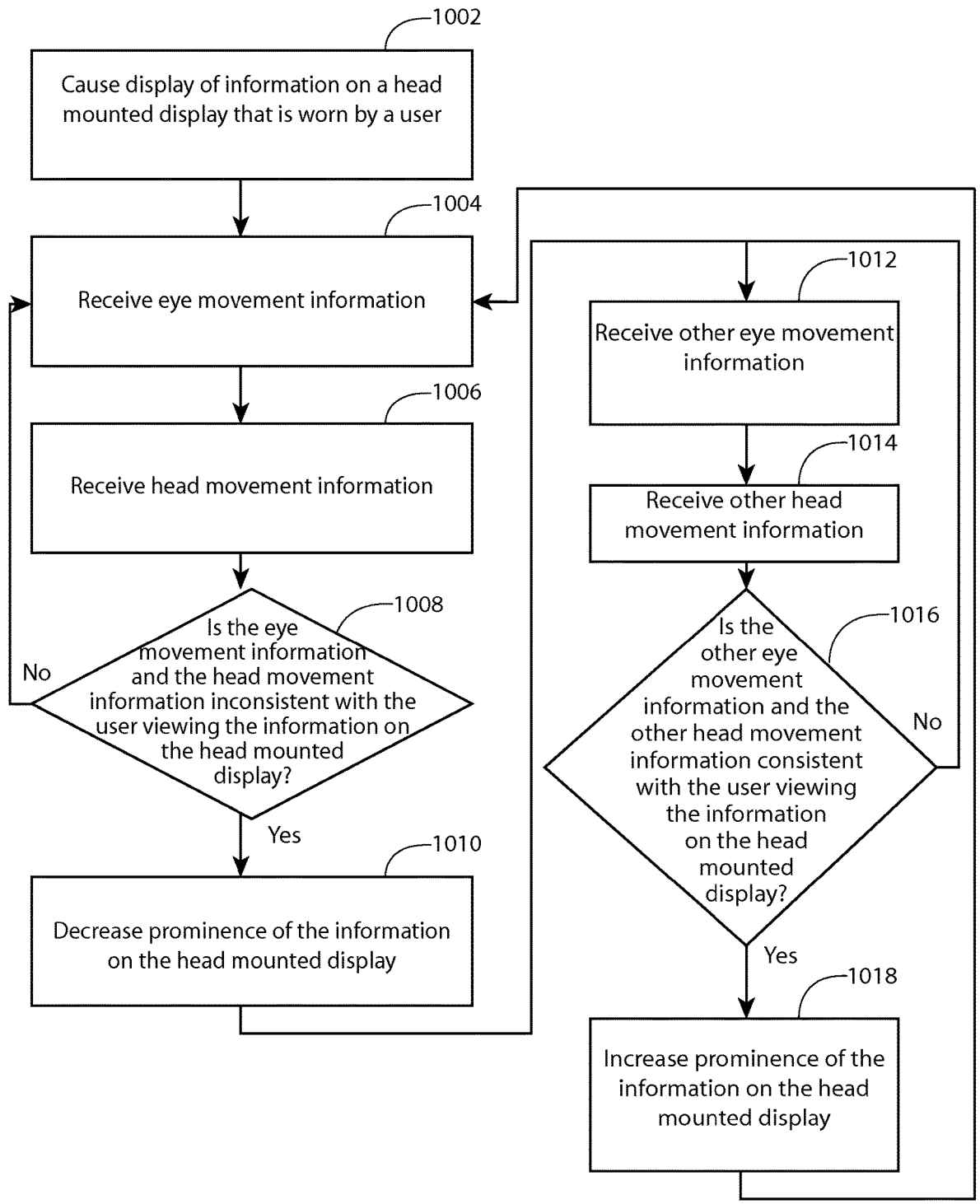
FIG. 10 is a flow diagram illustrating activities associated with causing display of information on a head mounted display that is worn by a user according to at least one example embodiment.

FIG. 10 is a flow diagram illustrating activities associated with causing display of information on a head mounted display that is worn by a user according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in some circumstances, it may be desirable for the apparatus to determine that eye movement information and head movement information are consistent with the user viewing the information on the head mounted display. For example, it may be desirable to increase the prominence of the information on the head mounted display in circumstances where the apparatus determines that eye movement information and head movement information are consistent with the user viewing the information on the head mounted display.

At block 1002, the apparatus causes display of information on a head mounted display that is worn by a user, similarly as described regarding block 702 of FIG. 7. At block 1004, the apparatus receives eye movement information associated with the user, similarly as described regarding block 704 of FIG. 7. At block 1006, the apparatus receives head movement information associated with the user, similarly as described regarding block 706 of FIG. 7.

At block 1008, the apparatus determines whether the eye movement information and the head movement information are inconsistent with the user viewing the information on the head mounted display, similarly as described regarding block 708 of FIG. 7. If the apparatus determines that the eye movement information and the head movement information are inconsistent with the user viewing the information on the head mounted display, flow proceeds to block 1010. If the apparatus determines that the eye movement information and the head movement information are consistent with the user viewing the information on the head mounted display, flow proceeds to block 1004. At block 1010, the apparatus the apparatus decreases prominence of the information on the head mounted display, similarly as described regarding block 710 of FIG. 7.

At block 1012, the apparatus receives other eye movement information associated with the user. The receipt and the other eye movement information may be similar as described regarding FIGS. 4A-4D and FIGS. 5A-5B.

At block 1014, the apparatus receives other head movement information associated with the user. The receipt and the other head movement information may be similar as described regarding FIGS. 4A-4D and FIGS. 5A-5B.

At block 1016, the apparatus determines whether the other eye movement information and the other head movement information are consistent with the user viewing the information on the head mounted display. The determination may be similar as described regarding FIGS. 5A-5B. If the apparatus determines that the eye movement information and the head movement information are consistent with the user viewing the information on the head mounted display, flow proceeds to block 1018. If the apparatus determines that the eye movement information and the head movement information are inconsistent with the user viewing the information on the head mounted display, flow proceeds to block 1012.

At block 1018, the apparatus increases prominence of the information on the head mounted display based, at least in part, on the determination that the other eye movement information and the other head movement information are consistent with the user viewing the information on the head mounted display. The decrease may be similar as described regarding FIGS. 5A-5B and FIGS. 6A-6F.

Figure 11:
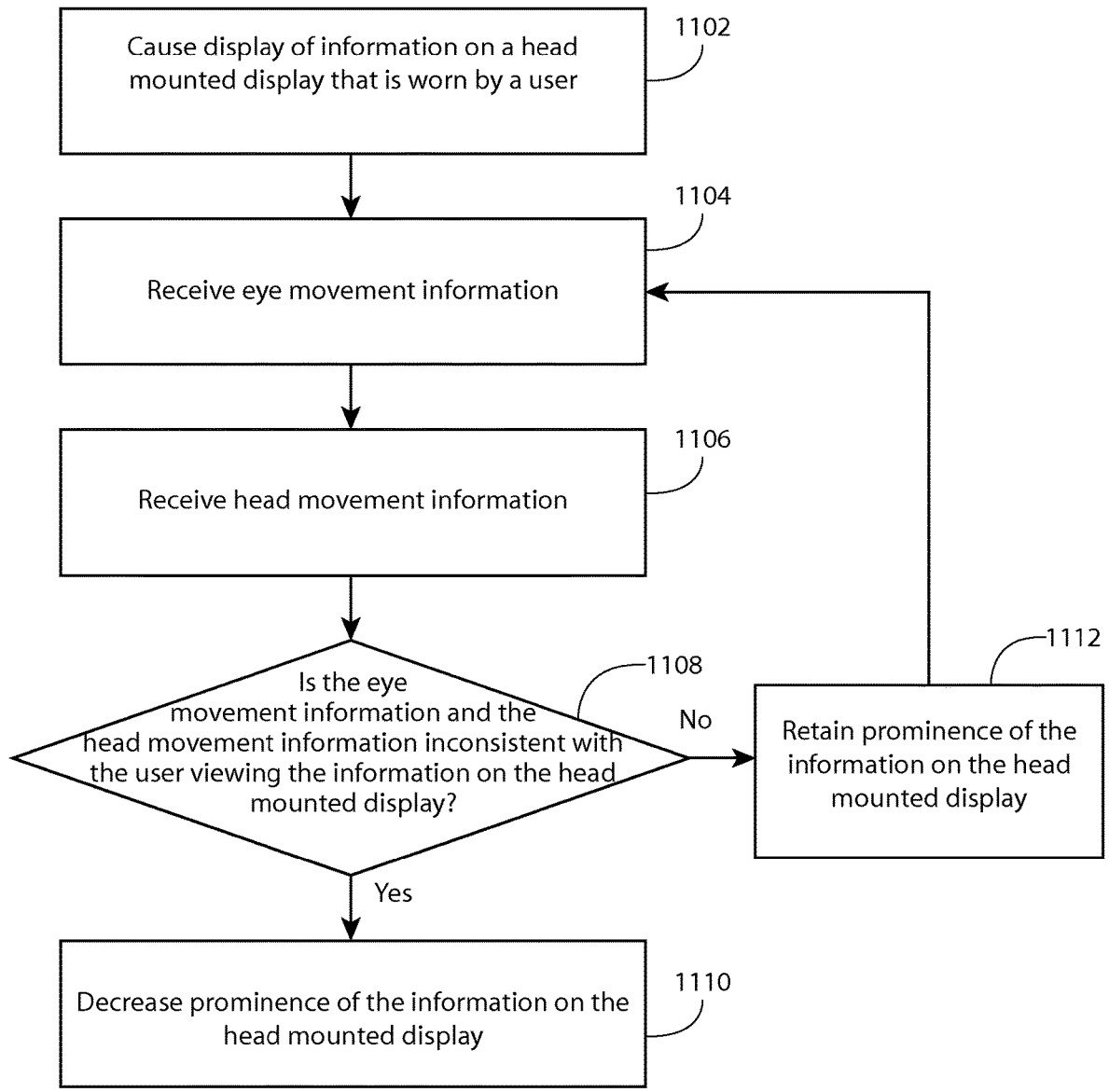
FIG. 11 is a flow diagram illustrating activities associated with causing display of information on a head mounted display that is worn by a user according to at least one example embodiment.

FIG. 11 is a flow diagram illustrating activities associated with causing display of information on a head mounted display that is worn by a user according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As discussed previously, in some circumstances, it may be desirable for the apparatus to retain prominence of the information on the head mounted display. For example, it may be desirable to retain the prominence of the information on the head mounted display in circumstances where the apparatus determines that eye movement information and head movement information are consistent with the user viewing the information on the head mounted display.

At block 1102, the apparatus causes display of information on a head mounted display that is worn by a user, similarly as described regarding block 702 of FIG. 7. At block 1104, the apparatus the apparatus receives eye movement information associated with the user, similarly as described regarding block 704 of FIG. 7. At block 1106, the apparatus receives head movement information associated with the user, similarly as described regarding block 706 of FIG. 7.

At block 1108, the apparatus whether the eye movement information and the head movement information are inconsistent with the user viewing the information on the head mounted display, similarly as described regarding block 708 of FIG. 7. If the apparatus determines that the eye movement information and the head movement information are inconsistent with the user viewing the information on the head mounted display, flow proceeds to block 1110. If the apparatus determines that the eye movement information and the head movement information are consistent with the user viewing the information on the head mounted display, flow proceeds to block 1112. At block 1110, the apparatus the apparatus decreases prominence of the information on the head mounted display, similarly as described regarding block 710 of FIG. 7.

At block 1112, the apparatus retains prominence of the information on the head mounted display based, at least in part, on the determination that the eye movement information and the head movement information are consistent with the user viewing the information on the head mounted display. The retention may be similar as described regarding FIGS. 5A-5B.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 704 of FIG. 7 may be performed after block 706 of FIG. 7. Furthermore, if desired, one or more of the above-described functions may be optional or may be combined. For example, block 704 of FIG. 7 may be optional and/or combined with block 706 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor; and
   at least one memory including computer program code, the memory and the computer program code configured to, working with the processor, cause the apparatus to perform at least the following:
   causation of display of information on a head mounted display that is worn by a user, wherein the head mounted display is at least partially see-through;

receipt of eye movement information associated with the user over a period of time;

receipt of head movement information associated with the user over the period of time;

comparison of the eye movement information and the head movement information associated with the period of time;

as a result of the comparison of the eye movement information and the head movement information, determination that the eye movement information relative to the head movement information indicate the user focusing on at least one non-virtual object viewed through the head mounted display, wherein determination that the eye movement information relative to the head movement information indicates the user is focusing on the at least one non-virtual object viewed through the head mounted display comprises a determination that a head deviation direction is different from an eye deviation direction and a determination that a magnitude of the eye movement is proportional to a magnitude of the head movement; and decrease of prominence of the information on the head mounted display based, at least in part, on the determination that the head deviation direction is different from the eye deviation direction.

2. The apparatus of claim 1, wherein the decrease of prominence of the information on the head mounted display comprises causation of increase of visual permeability of, at least part of, the head mounted display.

3. The apparatus of claim 1, wherein determination that the eye movement information relative to the head movement information indicates the user focusing on the at least one non-virtual object viewed through the head mounted display comprises determination that a head deviation direction is opposite to an eye deviation direction.

4. The apparatus of claim 1, wherein the memory includes computer program code configured to, working with the processor, cause the apparatus to perform:

receipt of other eye movement information associated with the user;

receipt of other head movement information associated with the user;

determination that the other eye movement information and the other head movement information indicate the user viewing the information on the head mounted display; and increase of prominence of the information on the head mounted display based, at least in part, on the determination that the other eye movement information and the other head movement information indicate the user viewing the information on the head mounted display.

5. The apparatus of claim 4, wherein receipt of the other eye movement information is performed subsequent to the decrease of prominence of the information on the head mounted display.

6. The apparatus of claim 1, wherein the memory includes computer program code configured to, working with the processor, cause the apparatus to perform:

receipt of other eye movement information associated with the user;

receipt of other head movement information associated with the user;

determination that the other eye movement information and the other head movement information indicate the user viewing the information on the head mounted display; and retention of prominence of the information on the head mounted display based, at least in part, on the determination that the other eye movement information and the other head movement information indicate the user viewing the information on the head mounted display.

7. The apparatus of claim 6, wherein the retention of the prominence of the information on the head mounted display is performed prior to the decrease of prominence of the information on the head mounted display.

8. The apparatus of claim 1, wherein the apparatus comprises the head mounted display.

9. A method comprising:

causing display of information on a head mounted display that is worn by a user, wherein the head mounted display is at least partially see-through;

receiving eye movement information associated with the user over a period of time;

receiving head movement information associated with the user over the period of time;

comparing the eye movement information and the head movement information associated with the period of time;

as a result of comparing the eye movement information and the head movement information, determining that the eye movement information relative to the head movement information indicates the user focusing on at least one non-virtual object viewed through the head mounted display, wherein determination that the eye movement information relative to the head movement information indicates the user is focusing on the at least one non-virtual object viewed through the head mounted display comprises a determination that a head deviation direction is different from an eye deviation direction and a determination that a magnitude of the eye movement is proportional to a magnitude of the head movement; and decreasing prominence of the information on the head mounted display based, at least in part, on the determination that the head deviation direction is different from the eye deviation direction.

10. The method of claim 9, wherein the decrease of prominence of the information on the head mounted display comprises causation of increase of visual permeability of, at least part of, the head mounted display.

11. The method of claim 9, wherein determination that the eye movement information relative to the head movement information indicates the user focusing on the at least one non-virtual object viewed through the head mounted display comprises determination that a head deviation direction is opposite to an eye deviation direction.

12. The method of claim 9, wherein the memory includes computer program code configured to, working with the processor, cause the apparatus to perform:

receipt of other eye movement information associated with the user;

receipt of other head movement information associated with the user;

determination that the other eye movement information and the other head movement information indicate the user viewing the information on the head mounted display; and increase of prominence of the information on the head mounted display based, at least in part, on the determination that the other eye movement information and the other head movement information indicate the user viewing the information on the head mounted display.

13. The method of claim 12, wherein receipt of the other eye movement information is performed subsequent to the decrease of prominence of the information on the head mounted display.

14. The method of claim 9, wherein the memory includes computer program code configured to, working with the processor, cause the apparatus to perform:
- receipt of other eye movement information associated with the user;
- receipt of other head movement information associated with the user;
- determination that the other eye movement information and the other head movement information indicate the user viewing the information on the head mounted display; and
- retention of prominence of the information on the head mounted display based, at least in part, on the determination that the other eye movement information and the other head movement information indicate the user viewing the information on the head mounted display.

15. A non-transitory computer-readable medium encoded with instructions that, when executed by a processor, perform:
- causation of display of information on a head mounted display that is worn by a user, wherein the head mounted display is at least partially see-through;
- receipt of eye movement information associated with the user over a period of time;
- receipt of head movement information associated with the user over the period of time;
- comparison of the eye movement information and the head movement information associated with the period of time;
- as a result of the comparison of the eye movement information and the head movement information, determination that the eye movement information relative to the head movement information indicates the user focusing on at least one non-virtual object viewed through the head mounted display, wherein determination that the eye movement information relative to the head movement information indicates the user is focusing on the at least one non-virtual object viewed through the head mounted display comprises a determination that a head deviation direction is different from an eye deviation direction and a determination that a magnitude of the eye movement is proportional to a magnitude of the head movement; and
- decrease of prominence of the information on the head mounted display based, at least in part, on the determination that the head deviation direction is different from the eye deviation direction.

16. The non-transitory computer-readable medium of claim 15, wherein determination that the eye movement information relative the head movement information indicates the user focusing on the at least one non-virtual object viewed through the head mounted display comprises determination that a head deviation direction is opposite to an eye deviation direction.

17. The apparatus of claim 1, wherein the determination that the eye movement information relative to the head movement information indicates the user focusing on at least one non-virtual object viewed through the head mounted display and not the information displayed on the head mounted display, and wherein the information displayed on the head mounted display at least partially obstructs at least a portion of at least one non-virtual object viewed through the head mounted display from a perspective of the user.

* * * * *